United States Patent
Vollath et al.

(10) Patent No.: US 9,322,918 B2
(45) Date of Patent: Apr. 26, 2016

(54) GNSS SURVEYING METHODS AND APPARATUS

(75) Inventors: Ulrich Vollath, Ismaning (DE); Nicholas Charles Talbot, Ashburton (AU)

(73) Assignee: Trimble Navigation Limited, Sunnyvale, CA (US)

(*) Notice: Subject to any disclaimer, the term of this patent is extended or adjusted under 35 U.S.C. 154(b) by 1116 days.

(21) Appl. No.: 13/148,305

(22) PCT Filed: Feb. 20, 2010

(86) PCT No.: PCT/US2010/000496
§ 371 (c)(1),
(2), (4) Date: Aug. 5, 2011

(87) PCT Pub. No.: WO2010/096190
PCT Pub. Date: Aug. 26, 2010

(65) Prior Publication Data
US 2011/0285587 A1    Nov. 24, 2011

Related U.S. Application Data

(60) Provisional application No. 61/208,340, filed on Feb. 22, 2009.

(51) Int. Cl.
*G01S 19/43* (2010.01)
*G01S 19/04* (2010.01)
(Continued)

(52) U.S. Cl.
CPC ............ *G01S 19/04* (2013.01); *G01S 19/07* (2013.01); *G01S 19/41* (2013.01); *G01S 19/43* (2013.01)

(58) Field of Classification Search
CPC ......... G01S 19/43; G01S 19/41; G01S 19/04; G01S 19/07
USPC ........................................ 342/357.26, 357.24
See application file for complete search history.

(56) References Cited

U.S. PATENT DOCUMENTS

| | | |
|---|---|---|
| 5,477,458 A | 12/1995 | Loomis |
| 5,495,257 A * | 2/1996 | Loomis ................ 342/357.29 |

(Continued)

FOREIGN PATENT DOCUMENTS

| | | |
|---|---|---|
| EP | 0 747 657 A2 | 12/1996 |
| EP | 1 262 789 A2 | 4/2002 |

(Continued)

OTHER PUBLICATIONS

G.L. Mader et al., Using Interpolation and Extrapolation Techniques to Yield High Data Rates and Ionosphere Delay Estimates from Continuously Operating GPS Networks, p. 2342-2348, ION GPS, Sep. 2002.*

(Continued)

*Primary Examiner* — Tashiana Adams
*Assistant Examiner* — Fred H Mull
(74) *Attorney, Agent, or Firm* — Kilpatrick Townsend & Stockton LLP

(57) ABSTRACT

Methods and apparatus are presented for improved productivity in determining static position of an antenna of a GNSS rover, such as in stop-and-go surveying. Computer-implemented methods and apparatus provide for determining a static position of an antenna of a GNSS rover from observations of GNSS signals collected at the antenna over multiple epochs and from correction data for at least one of the epochs. In some forms this comprises: acquiring first-epoch rover observations of GNSS signals received at the antenna during a first epoch, obtaining first-epoch correction data for the first epoch, determining a synchronized rover antenna position for the first epoch from the first-epoch rover observations and the first-epoch correction data, acquiring subsequent-epoch rover observations from the received GNSS satellite signals for at least one subsequent epoch for which correction data is unavailable, determining that the antenna position remained static for at least two static epochs, and determining an updated rover antenna position from the synchronized rover antenna position and the subsequent-epoch rover observations of at least one static epoch of the at least one subsequent epoch.

22 Claims, 12 Drawing Sheets

(51) Int. Cl.
  *G01S 19/07* (2010.01)
  *G01S 19/41* (2010.01)

(56) References Cited

U.S. PATENT DOCUMENTS

| | | | |
|---|---|---|---|
| 5,512,905 | A | 4/1996 | Nichols et al. |
| 5,519,620 | A * | 5/1996 | Talbot et al. ............... 701/2 |
| 5,554,994 | A | 9/1996 | Schneider |
| 5,572,218 | A | 11/1996 | Cohen et al. |
| 5,590,043 | A | 12/1996 | McBurney |
| 5,740,048 | A | 4/1998 | Abel et al. |
| 5,828,336 | A | 10/1998 | Yunck et al. |
| 5,841,026 | A | 11/1998 | Kirk et al. |
| 5,991,691 | A | 11/1999 | Johnson |
| 5,999,123 | A | 12/1999 | Disselkoen et al. |
| 6,067,484 | A | 5/2000 | Rowson et al. |
| 6,198,430 | B1 | 3/2001 | Hwang et al. |
| 6,324,473 | B1 | 11/2001 | Eschenbach |
| 6,397,147 | B1 | 5/2002 | Whitehead |
| 6,453,238 | B1 | 9/2002 | Brodie et al. |
| 6,490,524 | B1 | 12/2002 | White et al. |
| 6,529,830 | B1 | 3/2003 | Eschenbach |
| 6,664,923 | B1 | 12/2003 | Ford |
| 6,741,935 | B1 | 5/2004 | Eschenbach |
| 6,810,324 | B1 | 10/2004 | Nadkarni |
| 6,879,283 | B1 | 4/2005 | Bird et al. |
| 6,934,632 | B2 | 8/2005 | Hatch |
| 7,119,741 | B2 | 10/2006 | Sharpe et al. |
| 7,126,527 | B1 | 10/2006 | Bajikar |
| 7,193,559 | B2 | 3/2007 | Ford et al. |
| 7,312,747 | B2 | 12/2007 | Vollath et al. |
| 7,432,853 | B2 | 10/2008 | Vollath |
| 7,498,979 | B2 | 3/2009 | Liu et al. |
| 7,511,661 | B2 | 3/2009 | Hatch et al. |
| 7,538,721 | B2 | 5/2009 | Vollath et al. |
| 7,541,975 | B2 | 6/2009 | Sever et al. |
| 7,576,690 | B2 | 8/2009 | Vollath |
| 7,589,668 | B2 | 9/2009 | Vollath et al. |
| 7,692,578 | B2 | 4/2010 | Vollath et al. |
| 7,746,272 | B2 | 6/2010 | Vollath |
| 7,755,542 | B2 | 7/2010 | Chen et al. |
| 7,868,820 | B2 | 1/2011 | Kolb |
| 7,982,667 | B2 | 7/2011 | Vollath et al. |
| 8,130,143 | B2 | 3/2012 | Liu et al. |
| 8,237,609 | B2 | 8/2012 | Talbot et al. |
| 8,260,551 | B2 | 9/2012 | Janky et al. |
| 8,368,590 | B2 | 2/2013 | Vollath et al. |
| 8,368,591 | B2 | 2/2013 | Talbot et al. |
| 8,400,351 | B2 | 3/2013 | Talbot et al. |
| 2003/0036849 | A1 | 2/2003 | Ford et al. |
| 2004/0066335 | A1 | 4/2004 | Ashjaee |
| 2004/0267840 | A1 * | 12/2004 | Ono ............................ 708/200 |
| 2005/0192027 | A1 | 9/2005 | Kim et al. |
| 2006/0066478 | A1 * | 3/2006 | Maruyama et al. ...... 342/357.09 |
| 2007/0058161 | A1 | 3/2007 | Nichols et al. |
| 2007/0182628 | A1 | 8/2007 | Pomerantz et al. |
| 2007/0268179 | A1 | 11/2007 | Ogawa et al. |
| 2008/0238765 | A1 | 10/2008 | Zhang et al. |
| 2008/0243321 | A1 * | 10/2008 | Walser et al. .................. 701/21 |
| 2009/0135745 | A1 * | 5/2009 | Vollath et al. ............ 342/357.03 |
| 2009/0184868 | A1 | 7/2009 | Liu et al. |
| 2009/0184869 | A1 | 7/2009 | Talbot et al. |
| 2010/0141515 | A1 | 6/2010 | Doucet et al. |
| 2010/0253575 | A1 | 10/2010 | Vollath |
| 2011/0140959 | A1 | 6/2011 | Vollath |
| 2011/0148698 | A1 | 6/2011 | Vollath |
| 2011/0156949 | A1 | 6/2011 | Vollath et al. |
| 2011/0187590 | A1 * | 8/2011 | Leandro ................ G01S 19/43<br>342/357.27 |
| 2011/0267228 | A1 | 11/2011 | Talbot et al. |
| 2011/0279314 | A1 | 11/2011 | Talbot et al. |
| 2011/0285587 | A1 | 11/2011 | Vollath et al. |
| 2012/0026038 | A1 | 2/2012 | Vollath |
| 2012/0092213 | A1 | 4/2012 | Chen |
| 2012/0119944 | A1 | 5/2012 | Chen |
| 2012/0154210 | A1 | 6/2012 | Landau et al. |
| 2012/0154214 | A1 | 6/2012 | Leandro |
| 2012/0154215 | A1 | 6/2012 | Vollath et al. |
| 2012/0162007 | A1 | 6/2012 | Leandro et al. |
| 2012/0163419 | A1 | 6/2012 | Seeger |
| 2012/0229332 | A1 | 9/2012 | Vollath et al. |
| 2012/0286991 | A1 | 11/2012 | Chen et al. |
| 2012/0293367 | A1 | 11/2012 | Chen et al. |
| 2012/0306694 | A1 | 12/2012 | Chen et al. |
| 2013/0044026 | A1 | 2/2013 | Chen et al. |

FOREIGN PATENT DOCUMENTS

| | | |
|---|---|---|
| WO | 2005/045463 A1 | 5/2005 |
| WO | 2007/032947 A1 | 3/2007 |
| WO | 2008/008099 A2 | 1/2008 |
| WO | 2008/048242 A2 | 4/2008 |
| WO | 2008/051201 A2 | 5/2008 |
| WO | 2008/054371 A2 | 5/2008 |
| WO | 2009/000314 A1 | 12/2008 |
| WO | 2009/056363 A1 | 5/2009 |
| WO | 2009/058213 A2 | 5/2009 |
| WO | 2010/021656 A2 | 2/2010 |
| WO | 2010/021657 A2 | 2/2010 |
| WO | 2010/021658 A2 | 2/2010 |
| WO | 2010/021659 A2 | 2/2010 |
| WO | 2010/021660 A2 | 2/2010 |
| WO | 2010/042441 A1 | 4/2010 |
| WO | 2010/096158 A2 | 8/2010 |
| WO | 2010/096159 A2 | 8/2010 |
| WO | 2010/096160 A2 | 8/2010 |
| WO | 2011/034614 A2 | 3/2011 |
| WO | 2011/034615 A2 | 3/2011 |
| WO | 2011/034616 A2 | 3/2011 |
| WO | 2011/034617 A2 | 3/2011 |
| WO | 2011/034624 A2 | 3/2011 |
| WO | 2012/128979 A2 | 9/2012 |
| WO | 2012/128980 A1 | 9/2012 |
| WO | 2012/151006 A1 | 11/2012 |

OTHER PUBLICATIONS

J. Traugott et al., Making a Difference with GPS: Time Differences for Kinematic Positioning with Low-Cost Receivers, GPS World, May 2008.*

Function. (1992). In C. Morris , C. Morris , & C. Morris (Eds.), Academic press Dictionary of science and technology. Oxford, United Kingdom: Elsevier Science & Technology. Retrieved from http://search.credoreference.com/content/entry/apdst/function/0.*

M. Efe et al., A Tracking Algorithm for Both Highly Maneuvering and Nonmaneuvering Targets, Proceedings of the 36th Conference on Decision & Control, San Diego, California USA, Dec. 1999, pp. 3150-3155.

A. El-Rabbany, Introduction to GPS, 2d Ed., 2006, Chapter 5, pp. 65-82.

T. Ford et al., New Positioning Filter: Phase Smoothing in the Position Domain, Proceedings of the 15th International Technical Meeting of the Satellite Division of the Institute of Navigation ION GPS 2002, Sep. 24-27, 2002, Portland, Oregon, pp. 1850-1862.

B. Hofmann-Wellenhof et al., Global Positioning System Theory and Practice, Second Edition, 1993, pp. 115-118.

J. Kouba, A Guide to Using International GPS Service (IGS) Products, Version 21, Geodetic Survey Division, Natural Resources Canada, 2003, 2009 (34 pages).

D. Kozlov et al., Flying RTK Solution as Effective Enhancement of Conventional Float RTK, ION GNSS 20th International Technical Meeting of the Satellite Division, Sep. 25-28, 2007, Fort Worth, TX, pp. 351-356.

H. Landau et al., Virtual Reference Stations versus Broadcast Solutions in Network RTK—Advantages and Limitations, GNSS 2003, Apr. 2003, Graz, Austria (15 pages).

P. McBurney, A Robust Approach to Reliable Real-Time Kalman Filtering, IEEE Position Location and Navigation Symposium, Mar. 20-23, 1990, pp. 549-556.

P. Misra et al., Global Positioning System: Signals, Measurements, and Performance, Second Edition, 2006, ISBN 0-9709544-1-7, pp. 146-232.

(56) References Cited

OTHER PUBLICATIONS

Navstar Global Positioning System Interface Specification IS-GPS-200, Revision D, Dec. 7, 2004, GPS Joint Program Office (207 pages).
G. Seeber, Satellite Geodesy, 2nd Edition, 2003, pp. 269-276.
G. Seeber, Satellite Geodesy, 2nd Edition, 2003, pp. 289-295.
P. Teunissen, Theory of Integer Equivariant Estimation with Application to GNSS, Journal of Geodesy, vol. 77, Nos. 7-8, Oct. 2003, pp. 402-410.
P. Teunissen, GNSS Best Integer Equivariant Estimation, International Association of Geodesy Symposia, 2005, vol. 128, Symposium G04, pp. 422-427.
P. Teunissen et al.; GNSS Carrier Phase Ambiguity Resolution: Challenges and Open Problems, in M.G. Sideris (ed.); Observing Our Changing Earth, International Association of Geodesy Symposia 133, 2009, pp. 785-792.
J. Traugott et al., Time Differences for Kinematic Positioning with Low-Cost Receivers, GPS World, May 1, 2008 (6 pages).
J. Traugott et al. A Time-Relative Approach for Precise Positioning with a Miniaturized L1 GPS Logger, ION-GNSS 2008, 21st International Technical Meeting of the US Institute of Navigation, Satellite Division, Sep. 16-19, Savannah, GA, pp. 1883-1894.
Trimble Survey Controller Field Guide, Version 7.50, Part No. 32969-50-ENG, Revision A, Nov. 1999 (120 pages).
Trimble Introduces New Rugged Smart Antenna for Next Generation Grade Control Systems, Trimble Navigation Limited Press Release, Feb. 7, 2006 (2 pages).
Trimble MS990 GNSS Receiver Release Notes, Version 4.12, Revision A, Dec. 2009 (16 pages).
S. Verhagen, The GNSS integer ambiguities: estimation and validation, Publications on Geodesy 58, Delft, 2005, 194 pages, ISBN-13: 978 90 6132 290 0.
F. Takac et al., "SmartRTK: A Novel Method of Processing Standardized RTCM Network RTK Information for High Precision Positioning," Proceedings of ENC GNSS 2008, Apr. 22-25, Toulouse, France, 12 pp.
J. Traugott et al., Time Differences for Kinematic Positioning with Low-Cost Receivers, GPS World, May 1, 2008 (1 page).
International Search Report and Written Opinion of the International Searching Authority dated Oct. 19, 2010 in International Application No. PCT/US2010/000496, 8 pp.
Office Action dated Dec. 28, 2012 in Chinese Patent Application No. 2010 8000 8198.8 (5 pp.) with English-language translation (3 pp.)

* cited by examiner

GNSS SURVEYING METHODS AND APPARATUS

CROSS REFERENCE TO RELATED APPLICATIONS

The content of U.S. Provisional Application for Patent 61/208,340, Vollath, U. and Talbot, Nicholas C., "GNSS Surveying Methods and Apparatus," is incorporated herein by this reference and the priority benefit of the filing date thereof is hereby claimed.

The content of U.S. Pat. No. 7,432,853, VOLLATH U., "Ambiguity Estimation of GNSS Signals for Three or more Carriers," is incorporated herein by this reference.

The content of U.S. patent application Ser. No. 12/286,672, VOLLATH U., "Ambiguity Estimation of GNSS Signals for Three or more Carriers," filed Sep. 30, 2008, is incorporated herein by this reference.

The content of U.S. Pat. No. 7,312,747, VOLLATH U. and DOUCET K., "Multiple-GNSS and FDMA High-Precision Carrier-Phase Based Positioning," dated Dec. 25, 2007 is incorporated herein by this reference.

The content of Patent Application Publication US 2008/0165055, VOLLATH U. and DOUCET K., "GNSS Signal Processing with Frequency-Dependent Bias Modeling," dated Jul. 10, 2008 is incorporated herein by this reference.

The content of Patent Application Publication US 2008/0165054, VOLLATH U. and DOUCET K., "GNSS Signal Processing with Partial Fixing of Algorithms," dated Jul. 10, 2008 is incorporated herein by this reference.

The content of International Patent Publication WO 2007/032947, KOLB, P., "Ionosphere Modeling Apparatus and Methods," dated 22 Mar. 2007 is incorporated herein by this reference.

The content of Patent Application Publication US 2009/0027264, CHEN, X. and VOLLATH U., "GNSS Signal Processing Methods and Apparatus," dated Jan. 29, 2009 is incorporated herein by this reference.

The content of Patent Application Publication US 2008/0165053, LIU, J. and VOLLATH U. and WEST. P. and KLOSE S., "Fast Decimeter-Level GNSS positioning," dated Jul. 10, 2008 is incorporated herein by this reference.

The content of U.S. patent application Ser. No. 12/321,843, LIU, J. and VOLLATH U. and WEST. P. and KLOSE S., "Fast Decimeter-Level GNSS positioning," filed Jan. 26, 2009 is incorporated herein by this reference.

The content of U.S. patent application Ser. No. 12/291,888, VOLLATH U. and KLOSE S., "Real-Time Fast Decimeter-Level GNSS positioning," filed Nov. 14, 2008 is incorporated herein by this reference.

The content of International Patent Publication WO 2009/000314, VOLLATH U. and DOUCET K., "Position Tracking Device and Method," dated 31 Dec. 2008 is incorporated herein by this reference.

The content of U.S. patent application Ser. No. 12/319,623, TALBOT N. and VOLLATH U., "Processing Multi-GNSS Data From Mixed-Type Receivers," filed Jan. 8, 2009 is incorporated herein by this reference.

The content of International Patent Application No. PCT/US2008/012045, VOLLATH U., "Generalized Partial Fixing," with international filing date 23 Oct. 2008 is incorporated herein by this reference.

The content of U.S. Provisional Application for Patent 61/189,382, VOLLATH U. and TALBOT N., "Position Estimation Methods and Apparatus," filed 19 Aug. 2008 is incorporated herein by this reference.

The content of U.S. Pat. No. 5,512,905, NICHOLS, M. et al., "Pole-Tilt Sensor for Surveyor Range Pole," is incorporated herein by this reference.

FIELD OF THE INVENTION

The present invention relates to the field of Global Navigation Satellite Systems. More particularly, the present invention relates to methods and apparatus for determining a static position of an antenna of a GNSS rover such as in stop-and-go surveying.

BACKGROUND OF THE INVENTION

Global Navigation Satellite Systems (GNSS) include the Global Positioning System (GPS), the GLONASS system, the proposed Galileo system, and the proposed Beidou system.

In traditional RTK (real-time kinematic) GNSS positioning, the rover receiver (rover) collects real-time GNSS signal data and receives reference data from a base station or a network of reference stations. The base station and reference stations receive the GNSS signals at the same instant as the rover. Because the reference data arrives at the rover with a finite delay (latency) due to processing and communication, the rover stores its locally-collected data and matches it epoch by epoch with the arriving reference data. The rover then computes a synchronous position for each epoch using the matched data for that epoch. The synchronous data processing of traditional RTK positioning uses only matched reference and rover data to obtain the maximum possible accuracy. The need to wait for the reference data means that the computed position is always delayed with respect to the current position of the rover as reflected in the current GNSS data from the rover's GNSS-signal tracking loops. While the synchronous position computed by the rover is accurate, the accuracy comes with an inherent delay.

A prior-art delta-phase method used in kinematic survey is aimed at producing low-latency estimates of the rover position without waiting for the matching (synchronous) reference data to be received. When synchronous reference data is available for a given epoch, the rover uses it to compute a synchronous position for that epoch. When synchronous reference data is not available for a current epoch, the rover estimates its delta position (the change in rover position) from the last synchronous epoch until the current epoch) and adds this delta position to the last synchronous position to obtain a current low-latency position estimate while awaiting reference data for a further synchronous epoch. The price of this low-latency scheme is an additional error of about 1 mm per second of time difference between rover and reference data.

To maximize accuracy, prior-art processing for static-point surveys uses only synchronous data for epochs when the rover is static at the survey point, and also for ambiguity estimation (receiver initialization). The delay due to waiting for synchronous data has not been an issue in the prior art because static occupations have traditionally been in the range of at least a few seconds and because ambiguity resolution takes at least a couple of seconds.

Improved methods and apparatus for processing GNSS signals are desired, particularly to improve productivity in static position surveying with GNSS receivers.

SUMMARY OF THE INVENTION

Productivity is the main goal for surveys with more relaxed accuracy requirements. While control point surveys need a sub-centimeter accuracy that can only be achieved using a significant time span of data collected on a static point, so-called topographic surveys require only centimeter-level accuracy. On the other hand the topographic survey user needs to measure thousands of points in a time span as short as possible. The additional waiting period until the reference data arrives and the collection of multiple epochs of synchronized data are a real productivity disadvantage for topographic and other surveys requiring only the lower accuracy.

Improved methods and apparatus in accordance with some embodiments of the invention provide for improved productivity in determining static position of an antenna of a GNSS rover, such as in stop-and-go surveying.

Computer-implemented methods and apparatus in accordance with embodiments of the invention provide for determining a static position of an antenna of a GNSS rover from observations of GNSS signals collected at the antenna over multiple epochs and from correction data for at least one of the epochs. In accordance with some embodiments of the invention this comprises: acquiring first-epoch rover observations of GNSS signals received at the antenna during a first epoch, obtaining first-epoch correction data for the first epoch, determining a synchronized rover antenna position for the first epoch from the first-epoch rover observations and the first-epoch correction data, acquiring subsequent-epoch rover observations from the received GNSS satellite signals for at least one subsequent epoch for which correction data is unavailable, determining that the antenna position remained static for at least two static epochs, and determining an updated rover antenna position from the synchronized rover antenna position and the subsequent-epoch rover observations of at least one static epoch of the at least one subsequent epoch.

The correction data in such methods and apparatus may comprise at least one of: correction data prepared from observations of a base station, correction data prepared from observations of a network of reference stations, and precise orbit and clock information for satellites broadcasting the GNSS signals. In accordance with some embodiments, a minimum number of static epochs is mandated by at least one of: user input, a minimum occupation time at a survey point, and an estimated accuracy of the updated rover antenna position. In accordance with some embodiments, the at least two static epochs comprise the first epoch and at least one said subsequent epoch, and determining an updated rover antenna position comprises: for each said subsequent epoch of the static epochs, determining an unsynchronized rover antenna position from the rover observations of the respective subsequent epoch, and combining (e.g., averaging) the synchronized rover antenna position with the unsynchronized rover antenna positions of each subsequent epoch of the static epochs to obtain the updated rover antenna position.

In accordance with some embodiments, the at least two static epochs comprise respective said subsequent epochs, and determining an updated rover antenna position comprises: for each said static epoch, determining an unsynchronized rover antenna position change relative to the synchronized antenna position from the rover observations of the respective subsequent epoch and the rover observations of the first epoch, and combining (e.g., adding) the synchronized rover antenna position with the unsynchronized rover antenna position changes to obtain the updated rover antenna position.

In accordance with some embodiments, determining that the antenna position remained static for at least two static epochs comprises: receiving user input designating a static time interval, and determining that the static epochs are within the static time interval. In accordance with some embodiments, determining that the antenna position remained static for at least two static epochs comprises receiving input from a physical sensor comprising at least one of a contact switch, an inertial sensor, and a motion detector. In accordance with some embodiments, determining that the antenna position remained static for at least two epochs comprises: determining an unsynchronized rover antenna position for each of a plurality of epochs, comparing the unsynchronized rover antenna positions of respective epochs, and designating said respective epochs as static epochs when the difference between the unsynchronized rover antenna positions is less than a predetermined threshold.

BRIEF DESCRIPTION OF THE DRAWINGS

These and other aspects and features of the present invention will be more readily understood from the embodiments described below with reference to the drawings, in which.

DETAILED DESCRIPTION

Overview

Figure 1:
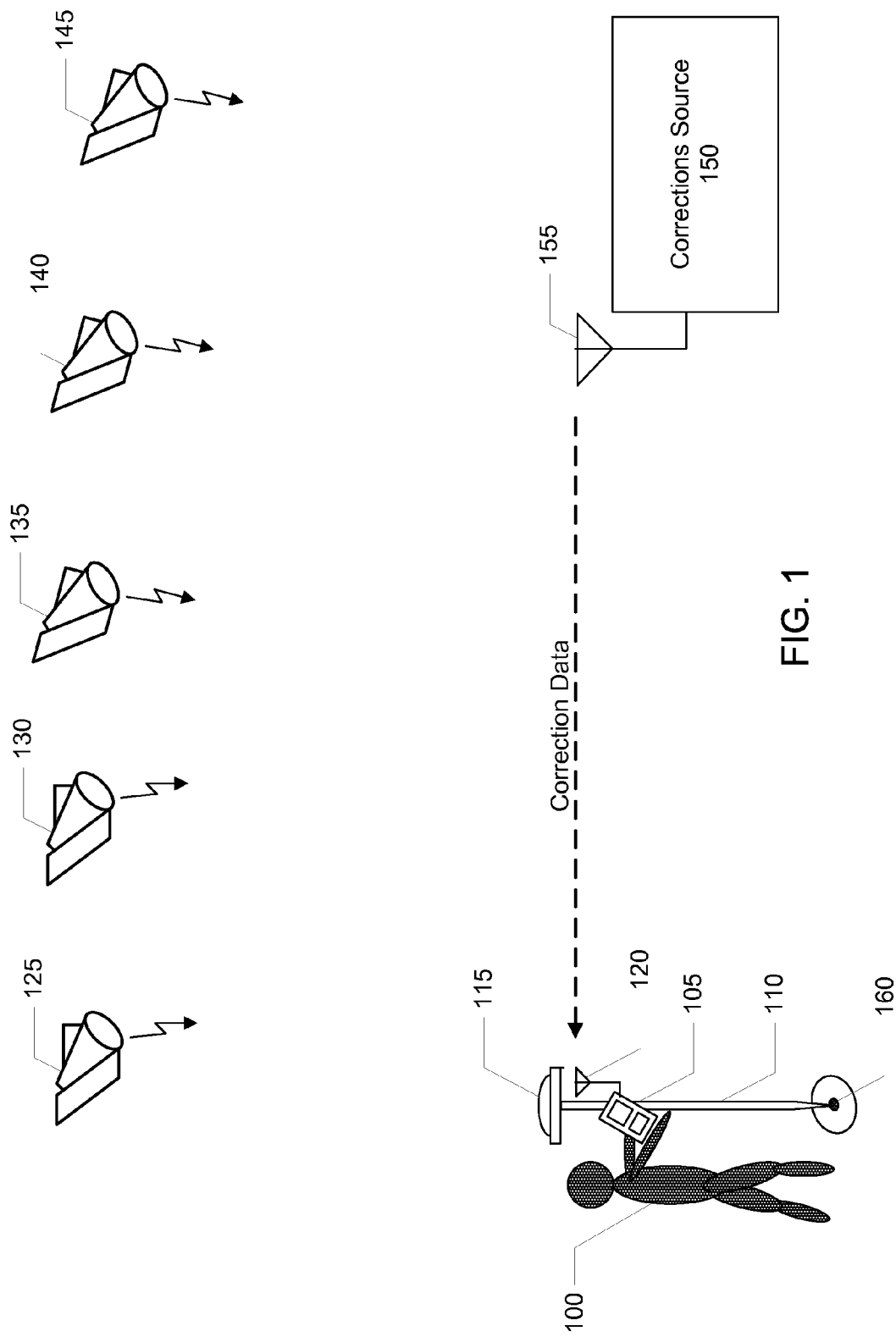
FIG. 1 schematically illustrates a scenario using a GNSS rover with correction data for point surveying.

FIG. 1 schematically illustrates a scenario using a GNSS rover with correction data for point surveying. A user 100 has a rover receiver (rover) 105 which is mounted on a range pole 110 or in some cases is a hand-held unit without range pole. Rover 105 includes a GNSS antenna 115 and a communications antenna 120. Rover 105 receives at its GNSS antenna 115 the signals from GNSS satellites 125, 130, 135, 140, 145, etc. Rover 105 also receives at its communications antenna 120 correction data from a corrections source 150 via a communications link 155. The communications link is, for example, a radio link or mobile telephone link, or any other suitable means of conveying the correction data to the rover 105. The correction data can be of any suitable type for improving the positioning accuracy of rover 105, such as: differential base station data from a base station serving as corrections source 150, or virtual reference station data from a network of reference stations serving as corrections source 150 (WAAS is one example), or precise orbits and clocks data from a Precise Point Positioning (PPP) service (the Canadian Spatial Reference System (CSRS) is one example) serving as corrections source 150. In the example of FIG. 1 the tip of the range pole 110 is placed on a survey point 160 and held in a level (vertical) position so that the phase center of GNSS antenna 115 is located over survey point 160.

Figure 2:
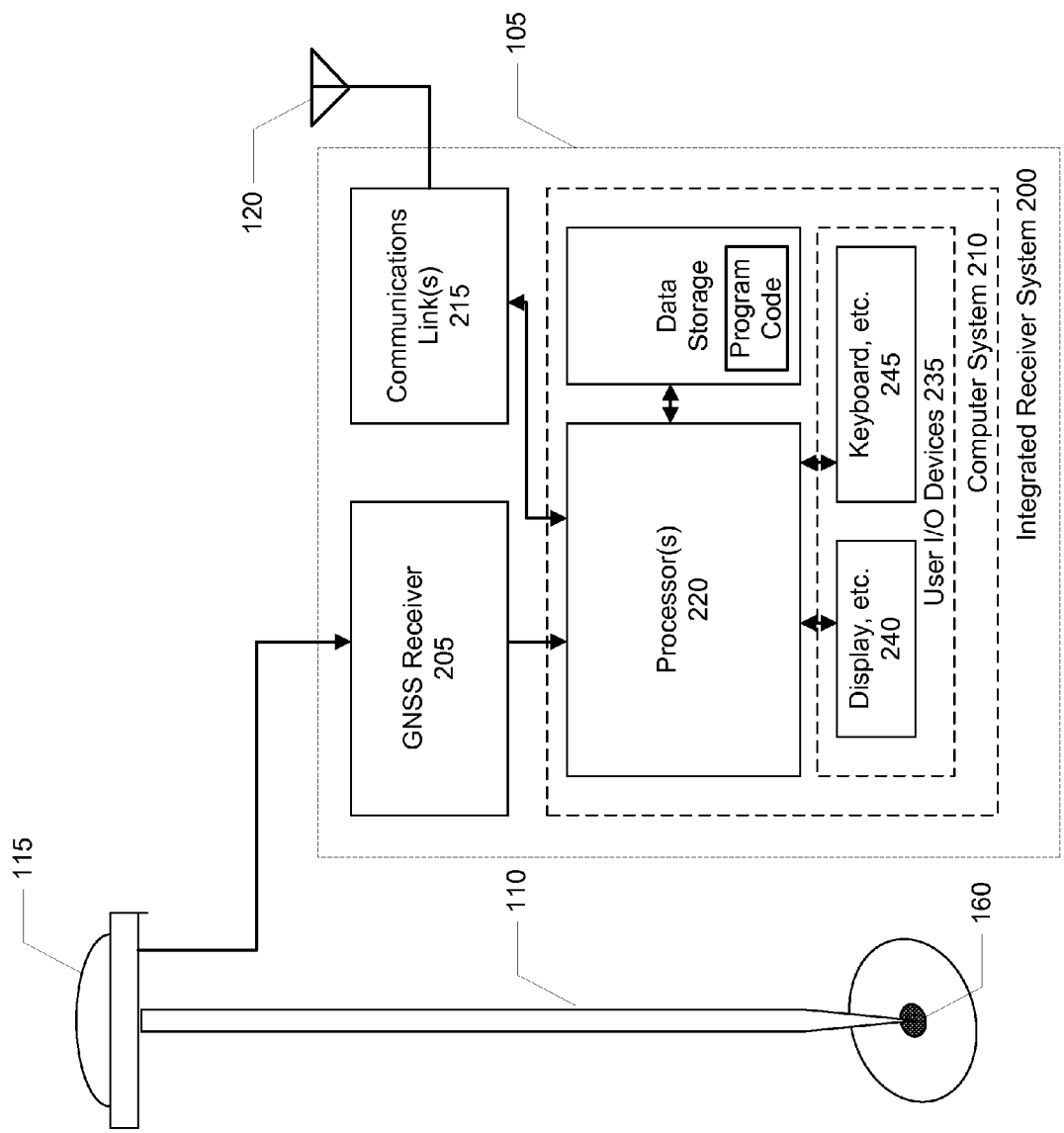
FIG. 2 is a block diagram of a typical integrated GNSS receiver system.

FIG. 2 is a block diagram of a typical integrated receiver system 200 with GNSS antenna 115 and communications antenna 120. Receiver system 200 can serve as rover 105 or as a base station or reference station. Receiver system 200 includes a GNSS receiver 205, a computer system 210 and one or more communications links 215. Computer system 210 includes one or more processors 220, one or more data storage elements 225, program code 230 for controlling the processor(s) 220, and user input/output devices 235 which may include one or more output devices 240 such as a display or speaker or printer and one or more devices 245 for receiving user input such as a keyboard or touch pad or mouse or microphone.

The program code 230 is adapted to perform novel functions in accordance with embodiments of the invention as described below. The integrated receiver system 200 can otherwise be of a conventional type suited for mounting on a range pole or for hand-held operation; some examples include the Trimble R8 GNSS, Trimble R7 GNSS, Trimble R6 GPS and Trimble 5700 surveying systems and the Trimble GPS Pathfinder Pro XRS system.

Figure 3:
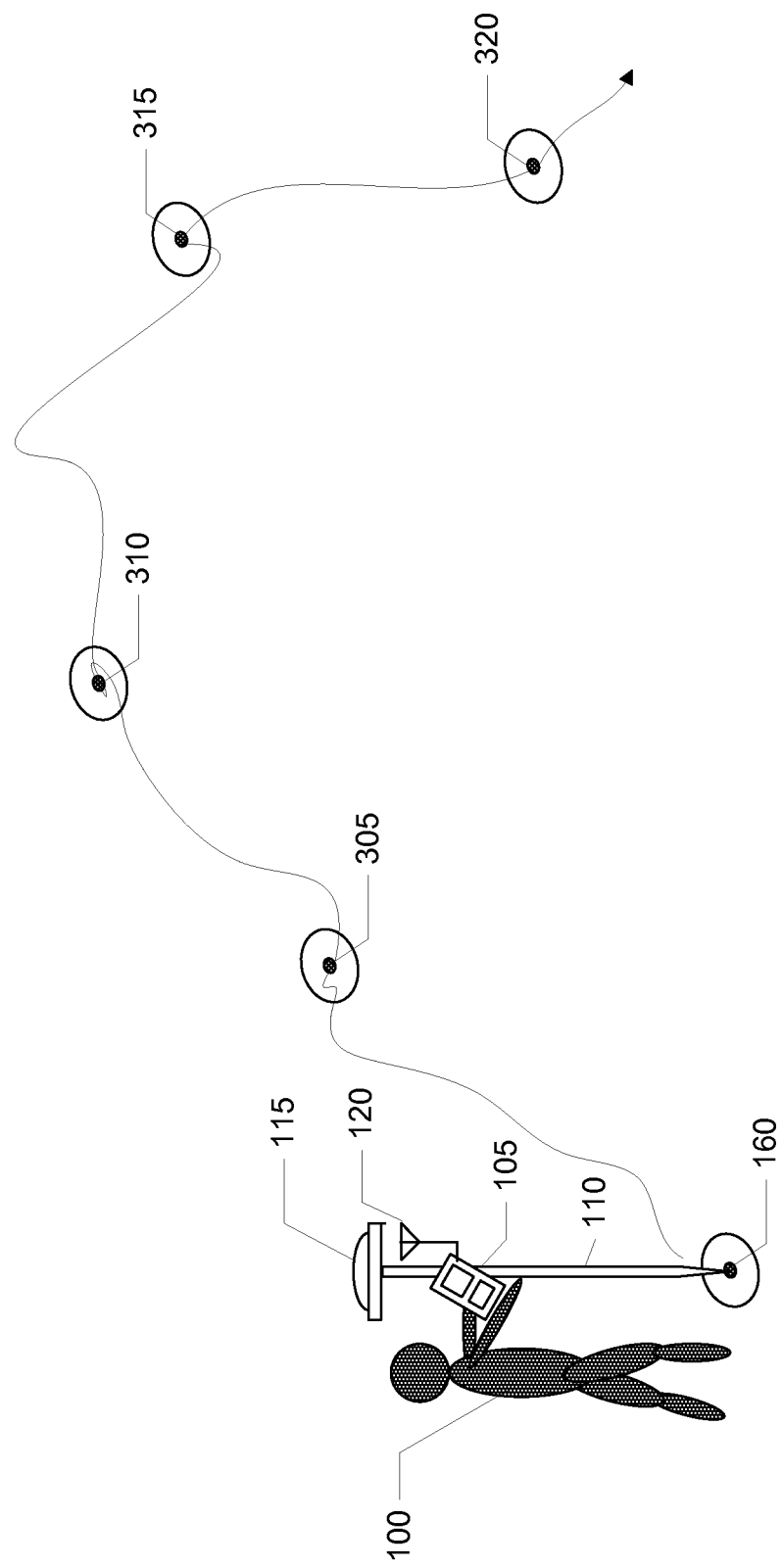
FIG. 3 schematically illustrates a typical stop-and-go point surveying scenario.

FIG. 3 schematically illustrates a typical stop-and-go point surveying scenario. User 100 places the tip of range pole 110 on a survey point 160, holds the pole level (vertical) so that the phase center of GNSS antenna 115 is located over the survey point 160, and provides input (such as pressing a key) to indicate that the rover antenna is static at the survey point while maintaining the antenna 115 static until enough data is collected to achieve the needed accuracy. The user then repeats the procedure at each of survey points 305, 310, 315, 320, etc., in sequence.

Figure 4:
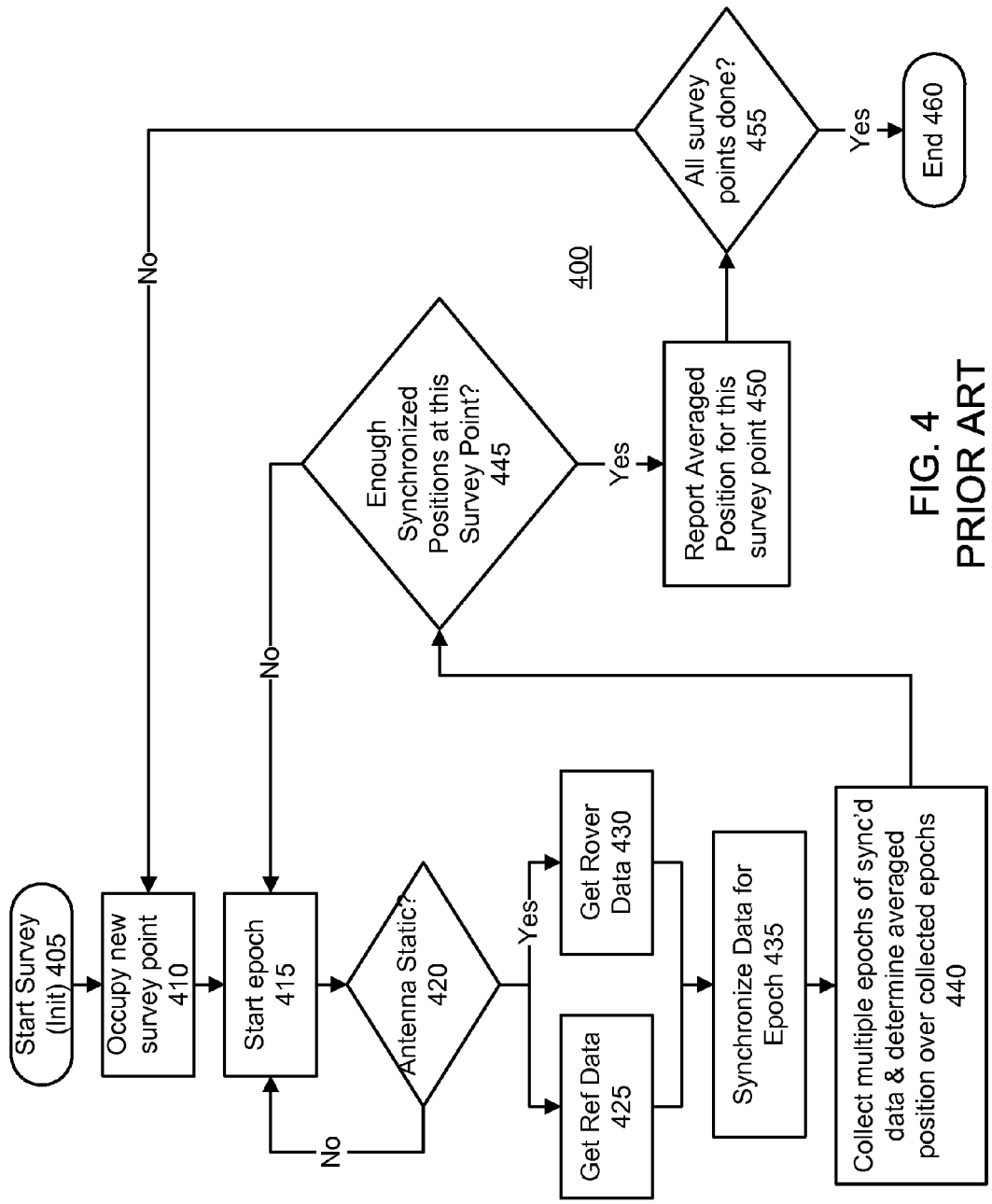
FIG. 4 is flow diagram illustrating a typical prior-art stop-and-go GNSS surveying method.

FIG. 4 is flow diagram illustrating a typical prior-art stop-and-go GNSS surveying method 400. The user starts the survey at 405 after starting the rover's GNSS receiver and waiting until the receiver is initialized (until ambiguities have been determined). The receiver system typically indicates when it is initialized and is ready to begin survey operations. At 410 the rover receives user input (e.g., by the user pressing a key) that the rover antenna is static at a new survey point. At 425 the rover gets GNSS reference data. At 430 the rover gets GNSS rover data. At 435 the reference data and rover data are synchronized (matched) epoch by epoch for processing. At 440, epochs of synchronous reference and rover data are processed and an averaged rover antenna position is determined over the collected epochs. At 445 a check is made whether enough synchronous positions have been averaged at this survey point to achieve the needed position accuracy. If no, then a next epoch is started at 415 for this survey point. If yes, then the averaged position for this survey point is reported, typically by storing the averaged position and displaying it for the user. At 455 a check is made whether all survey points have been completed. If no, the user is signaled to occupy a new survey point at 410. If yes, then the survey ends at 460.

Figure 5:
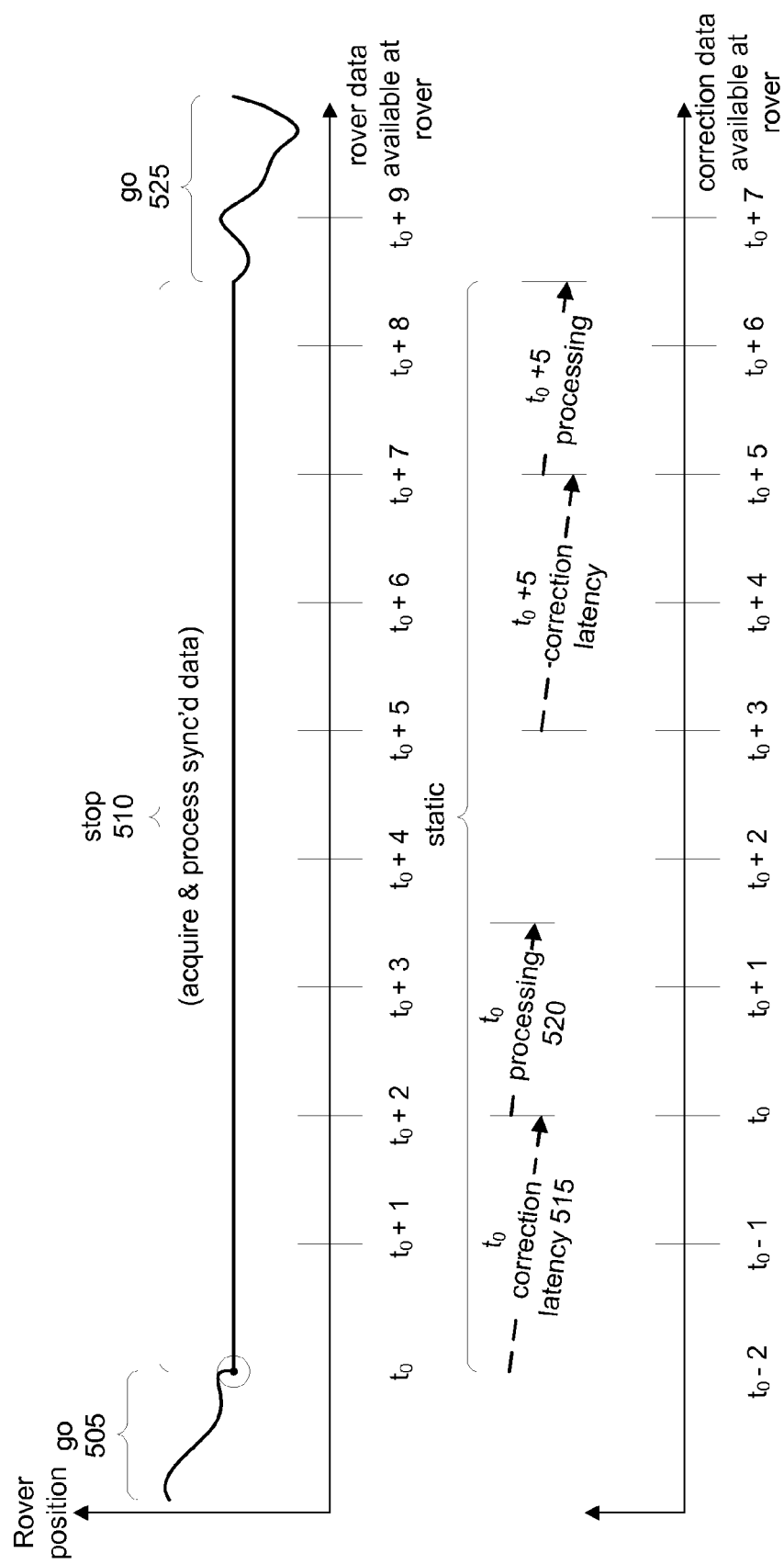
FIG. 5 illustrates the time required to survey a point using the method of FIG. 4.

FIG. 5 illustrates the time required to survey a point using the method of FIG. 4. During a "go" period 505 the rover is moving. At time $t_0$ the rover antenna is placed on the survey point and the user indicates that the antenna is static, such as by pressing a key. A "stop" period 510 begins at time $t_0$. During "stop" period 510 the rover antenna must be held stationary while the rover acquires GNSS data, receives synchronous correction data, and processes enough synchronous epochs to achieve the desired position accuracy. For the rover to process data it acquires at epoch to it must wait for the matching-epoch corrections during a latency period indicated at 515—the time needed for the correction data for epoch $t_0$ to be prepared at the source and transmitted to the rover. Then the rover requires a finite processing time as indicated at 520 to match the rover and reference data for epoch $t_0$ and compute a position for that epoch. In the example of FIG. 5, the latency period 515 and processing time 520 amount to about 3½ epochs, and five epochs of data are to be averaged for the survey point. The "stop" period during which the user must hold the rover antenna stationary is thus 8½ epochs in this example. A typical correction data rate is 1 Hz (1 epoch per second), in which case the minimum "stop" period for this example is 8.5 seconds plus any user delay. When enough epochs of synchronous data have been averaged, the next "go" period 525 is signaled to the user, who can then move the rover to the next survey point.

Several time-consuming factors are involved in measuring a static point in a stop-and-go survey with a GNSS rover receiver: (1) waiting for reference data to arrive at the rover to compute the rover's antenna position using reference data which is synchronized with data collected by the rover during static occupation of the survey point; (2) waiting for a required number of epochs of GNSS data to be collected by the rover during static occupation of the survey point; (3) leveling the range pole, if any, on which the rover is mounted and keeping the rover static while pressing a "measure" or "register" button to indicate to the rover the data to be used in computing the rover's antenna position, and (4) assuring that only static data is used in computing the rover's antenna position or repeating the survey of the point if this was not done correctly.

As to point (1), some embodiments in accordance with the invention employ a delta phase technique for processing of static points in GNSS survey, avoiding the need to wait for reference data to arrive at the rover while the rover is static. The processing has similarities to low-latency kinematic positioning, but is modified to meet the needs of static-point-survey applications.

As to point (2), some embodiments in accordance with the invention employ a higher update rate for the rover data than for the reference data. This does not reduce the accuracy of the computed position because a real convergence does not occur even with a few epochs of the 1 Hz update rate typical of the prior art.

As to point (3), some embodiments, in accordance with the invention provide for improved workflows for surveys of large numbers of static points.

As to point (4), some embodiments in accordance with the invention provide for automatic detection of which data was collected while the rover antenna was static.

Principles of Static Delta Phase

Some embodiments in accordance with the invention use low-latency processing with delta-phase derived from rover data having a higher update rate than the reference data. As soon as the point occupation period has started (efficient ways to determine this are described below), the high update-rate delta-phase derived position updates with respect to the last known synchronized data epoch are accumulated. The last synchronized position does not have to come from a static part of the survey. The high update rate of the rover data assures that any imposed minimum number of epochs is quickly met. Slowly changing errors such as due to multipath are not mitigated even by prior-art methods which average only a few seconds of synchronous data; random (white) noise is, however, effectively averaged over the imposed minimum number of epochs of high-update rate delta-phase derived position updates.

Figure 6:
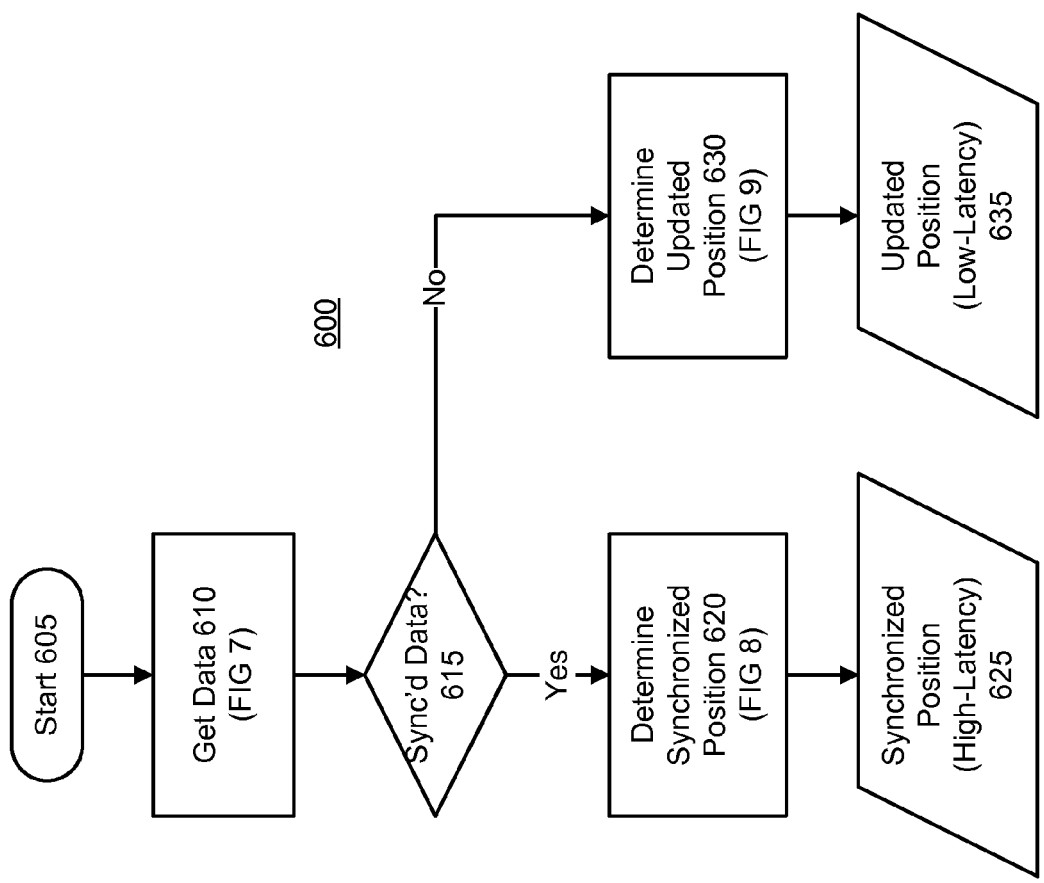
FIG. 6 is a high-level flow diagram of an improved stop-and-go survey method in accordance with some embodiments of the invention.

FIG. 6 is a high-level flow diagram of an improved stop-and-go survey method 600 in accordance with some embodiments of the invention. The user starts the survey at 605 after starting the rover's GNSS receiver and waiting until the receiver is initialized (until ambiguities have been determined). The receiver system typically indicates when it is initialized and is ready to begin survey operations. At 610 the process continuously gets data, as explained in more detail with reference to FIG. 7. At 615 the data is checked to determine whether synchronous rover data and reference data is available for an epoch. If yes, then at 620 a high-latency synchronous rover position 625 is determined for the epoch, as explained in more detail with reference to FIG. 8. If no, then at 630 a low-latency updated position 635 is determined, as explained in more detail with reference to FIG. 9.

Figure 7:
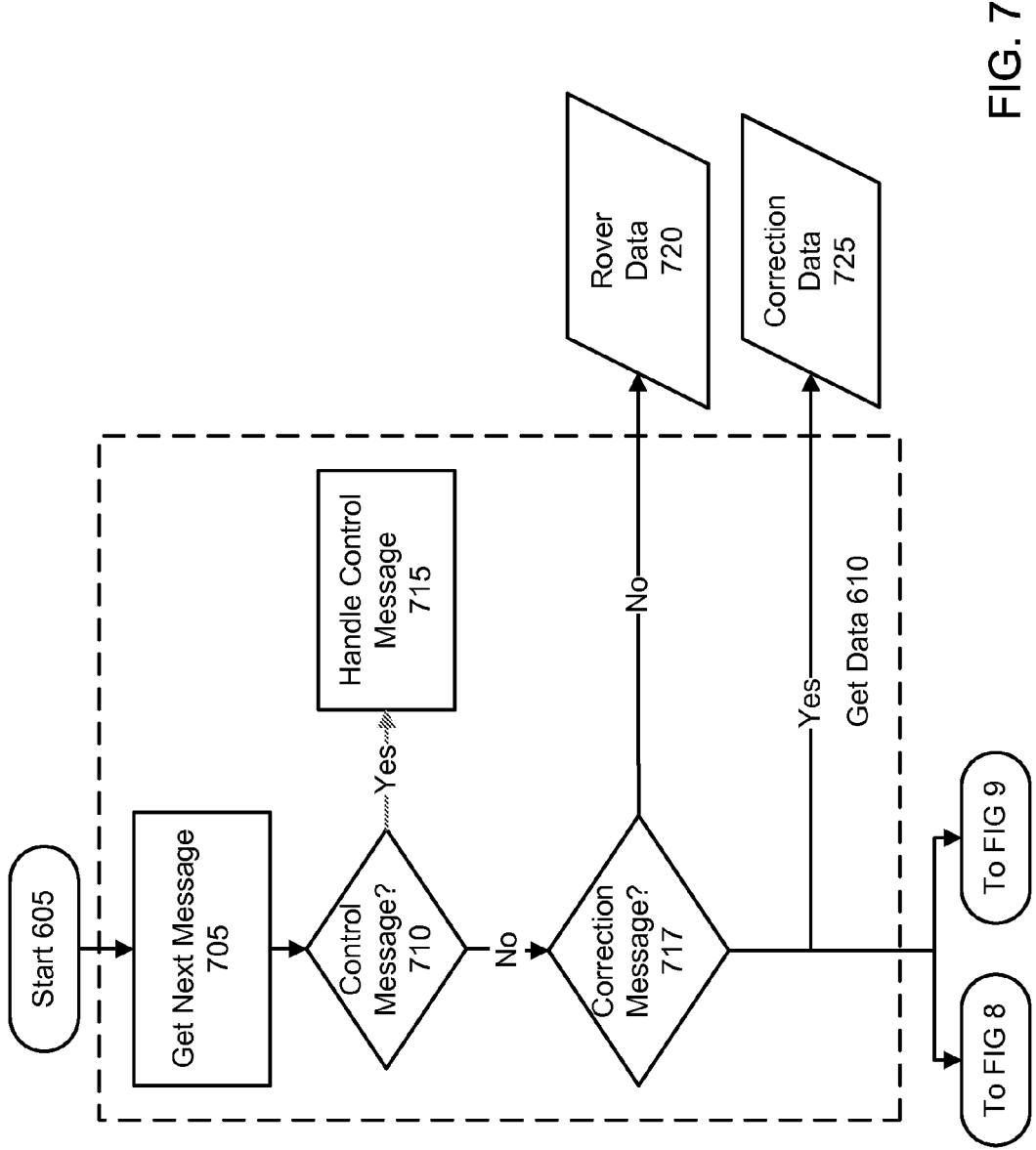
FIG. 7 is a more detailed flow diagram of an embodiment of the "get data" block of FIG. 6.

FIG. 7 is a more detailed flow diagram of an embodiment of the "get data" block 610 of FIG. 6. At 705 a next message is retrieved from memory. At 710 a check is made whether the message is a control message. If yes, then at 715 the control message is handled. If no, then a check is made at 717 whether the message is a correction 10 message. If no, then it is determined to be rover data 720. If yes, then it is determined to be correction data 725, and the flow continues to FIG. 8 and FIG. 9.

Figure 8:
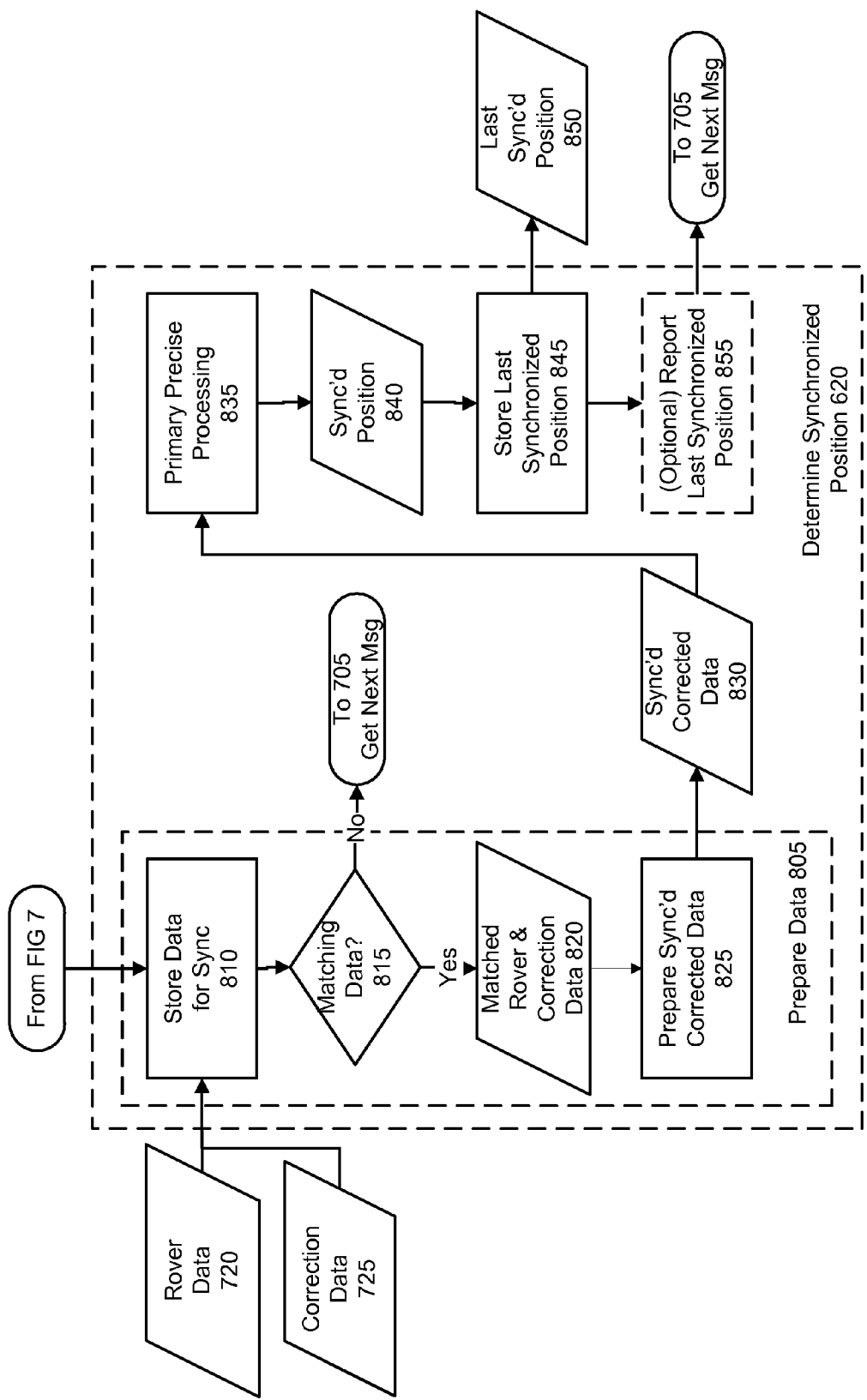
FIG. 8 is a more detailed flow diagram of an embodiment of the "determine synchronized position" block of FIG. 6.

FIG. 8 is a more detailed flow diagram of an embodiment of the "determine synchronized position" block 620 of FIG. 6. At 805 rover data 720 and correction data are prepared as synchronized corrected data 830. In particular, at 810 rover data 720 and correction data 725 are stored for possible synchronization. At 815 a check is made whether matching-epoch rover data and correction data are available. If no, the flow passes to block 705 to retrieve the next message. If yes, the matched rover and correction data 820 are passed to block 825 where the synchronized corrected data 830 are prepared. At 835 the synchronized corrected data 830 are used in primary precise processing to determine a synchronized position 840. At 845 the latest synchronized position 850 is stored for further use. At 855 the latest synchronized position 850 is optionally reported, e.g., stored and/or displayed or otherwise provided to the user. The flow then passes to block 705 to retrieve the next message.

Figure 9:
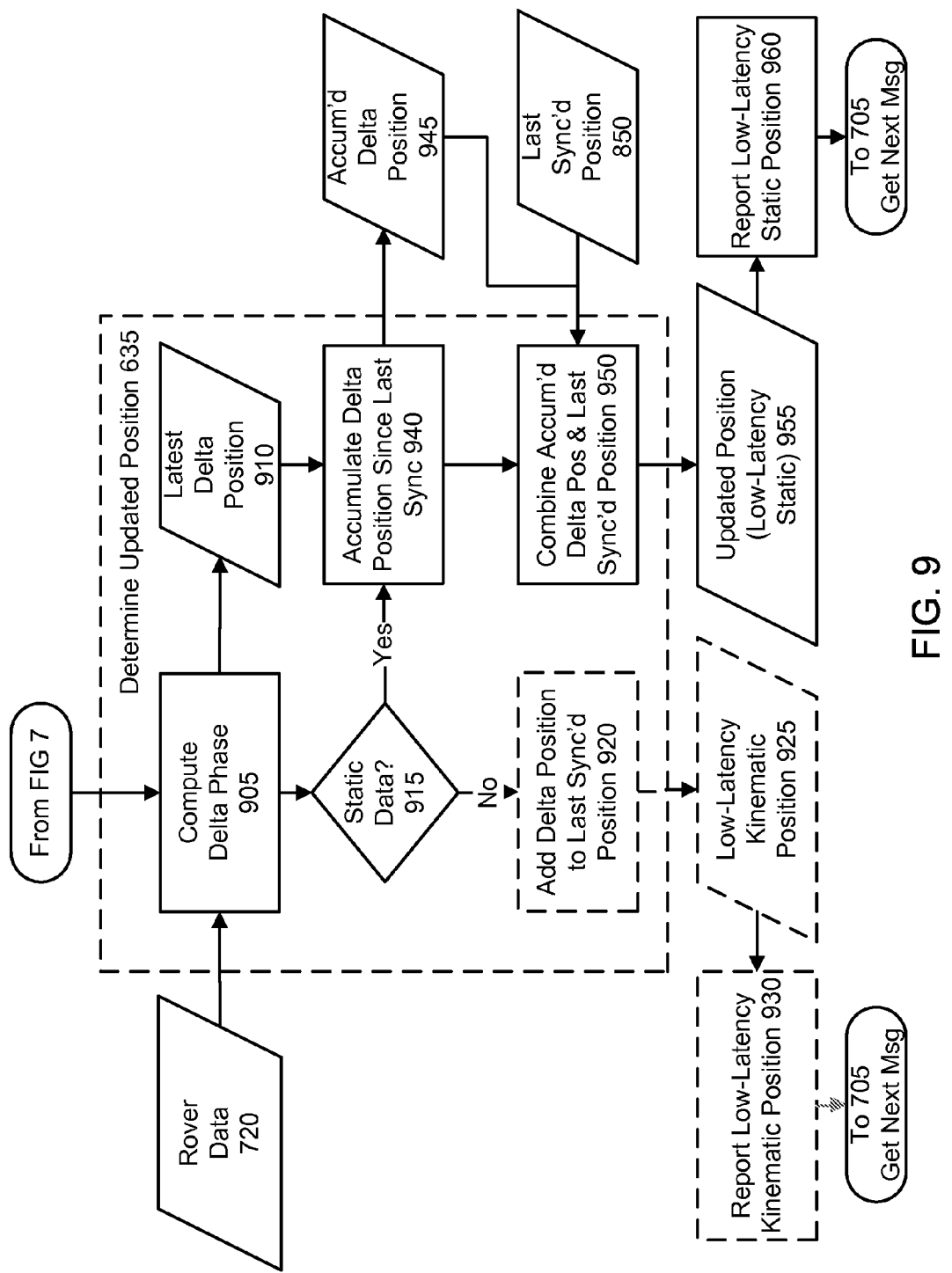
FIG. 9 is a more detailed flow diagram of an embodiment of the "determine updated position" block of FIG. 6.

FIG. 9 is a more detailed flow diagram of an embodiment of the "determine updated position" block 635 of FIG. 6. At 905 rover data 720 is used to compute a latest delta phase position 910. At 915 a check is made whether the rover data used to compute the latest delta phase position is static data (data collected while the rover antenna was static). (Various methods of determining whether data are to be considered static data are discussed below.) If no, then at 920 the latest delta position is added to the latest synchronized position 850 to produce a low-latency kinematic position 925. At 930 the low-latency kinematic position is optionally reported, e.g., stored and/or displayed or otherwise provided to the user. The flow then passes to block 705 to retrieve the next message. If at 915 the rover data is found to be static data, then at 940 the delta position data 945 since the last synchronized position 850 is accumulated. At 950, the accumulated delta position data 945 is combined with the last synchronized position 850 to obtain an updated low-latency static position 955. The updated low-latency static position 955 is reported at 960, e.g., stored and/or displayed or otherwise provided to the user. The flow then passes to block 705 to retrieve the next message.

Combining the accumulated delta position data 945 with the last synchronized position 850 at 950 can take different forms. For example, if the last synchronized position 850 is a static rover antenna position (e.g., a "stop" period for the rover), then the accumulated delta position data 945 is averaged with the last synchronized position 850 to obtain the updated low-latency static position 955. For example, if the last synchronized position 850 is not a static rover antenna position (a "go" period for the rover), then the accumulated static delta position data 945 is averaged (over the "stop" period for the rover) and added to the last synchronized position 850 to obtain the updated low-latency static position 955.

In some embodiments, the static occupation periods are simply averaged using the covariance information coming from the delta-phase process and from the synchronous epoch's evaluation. In other embodiments, the accumulation is run inside the delta-phase filter. Kinematic processing is favored for motion detection as discussed below.

Figure 10:
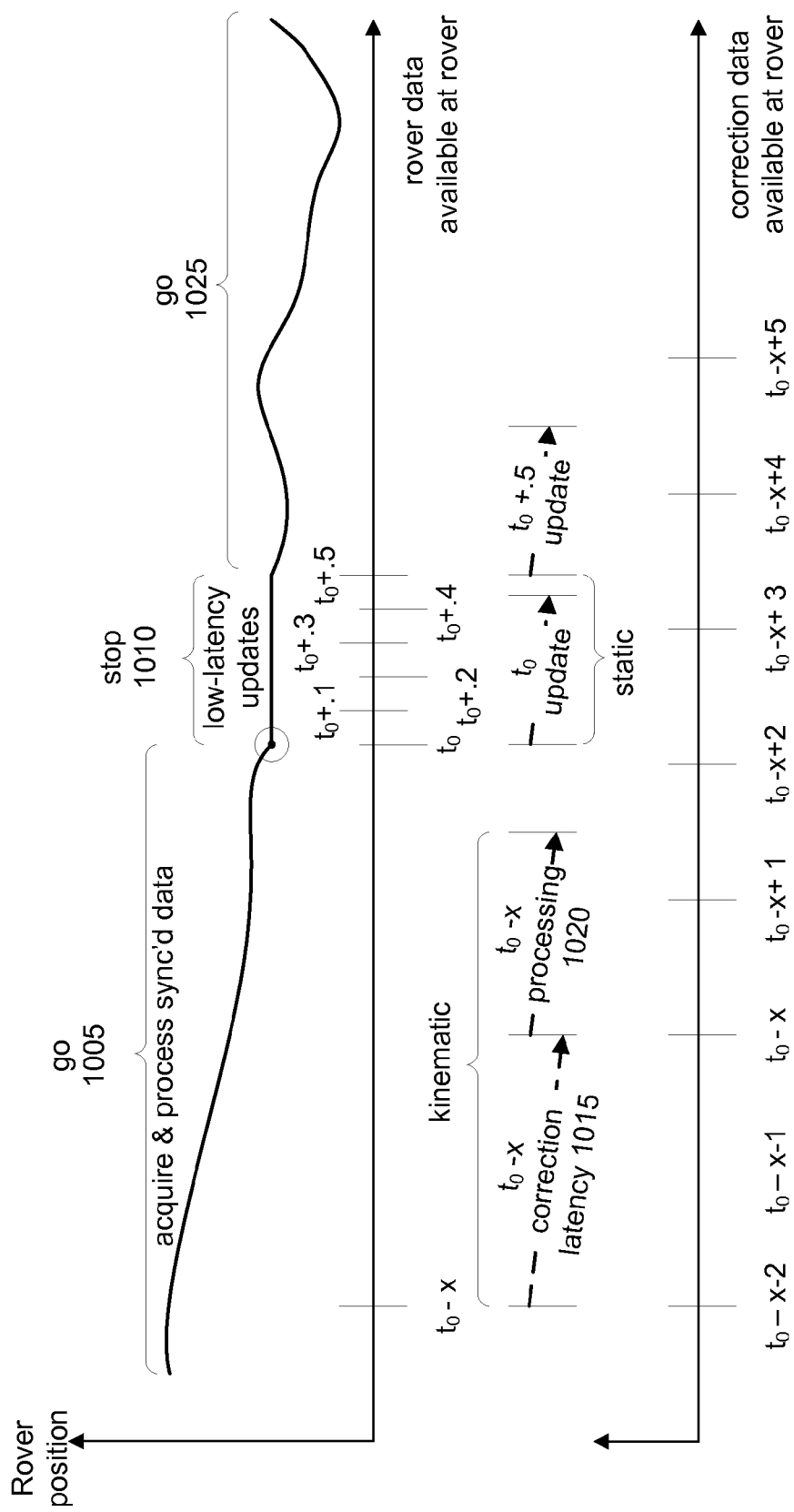
FIG. 10 illustrates the time required to survey a point using a method in accordance with some embodiments of the invention.

FIG. 10 illustrates the time required to survey a point using a method in accordance with some embodiments of the invention. During a "go" period 1005 the rover is moving. During the "go" period the rover operates in kinematic mode, matching locally-acquired rover data with correction data to compute synchronous positions, albeit with a latency 1015 due to delayed arrival of the corrections and the required processing time 1020. In the example of FIG. 10 the overall delay to compute a synchronous rover position for epoch $t_0-x$ is shown as 3½ epochs, comparable to the delay encountered for each synchronous position in the example of FIG. 5, but different in that the delay occurs during the "go" period so that this delay does not require the user to wait. At time $t_0$ the user places the rover antenna over the survey point and the static point rover data collection begins. Using a static delta phase technique in accordance with embodiments of the invention, static position updates are prepared from rover data collected during this "stop" period 1010, and the updates are then combined with the latest synchronous rover position, e.g., for epoch $t_0-x$. The result is a static point position averaged over a required number of epochs $t_0$, $t_0+0.1$, $t_0+0.2$, $t_0+0.3$, $t_0+0.4$, $t_0+0.5$. These epochs are determined by the rate at which the rover collects data locally, rather than by the much lower rate at which correction data is received. For example, the rover data rate may be at 10 Hz, 20 Hz or even 50 Hz, while the correction data is typically received at 1 Hz. Thus the required number of epochs to achieve the desired position accuracy are available in a much shorter time. Further, the processing time to prepare the updates is less than the processing time to prepare synchronous positions, and can be carried out in part or in whole during the subsequent "go" period 1025. User time is saved by (1) determining synchronous position in kinematic mode in the "go" period while the user is moving from one survey point to the next, (2) using higher-rate rover data to compute delta-phase updates during the "stop" period, and (3) combining the delta-phase updates accumulated during the "stop" period with the synchronous position determined during the preceding "go" period to obtain a static point position averaged over multiple rover-observation epochs, preferably during the subsequent "go" period. The result is a considerable saving of user time over a survey of many points.

Consider for example a scenario with reference data being broadcast at one epoch per second with a typical latency of 2 seconds and four epochs of data required for each point measurement. In this scenario the prior-art method would require five seconds from start of point measurement to storing the resulting position. In contrast, the static delta-phase method of embodiments of the present invention would only require 0.3 seconds plus any latency introduced by controller software and user interaction. For a topographic survey of 1000 points, more than an hour of waiting time can be eliminated for the user. Methods which reduce the user interaction and controller delays are discussed below.

Automatic Selection of Best Result from Available Synchronous and Delta-Phase Results For a static point occupation, typically the criteria to finish the point measurement are dictated by a combination of desired position accuracies and the number of synchronous epochs of data to be collected while the antenna is static. In prior-art survey equipment, that decision is taken by the controller software.

In some embodiments of the invention, if the accuracy of the static delta-phase positioning does not meet the convergence criteria before the reference data for the epoch of the first static point rover data arrives, the position processing automatically switches to the slightly more accurate synchronized processing of the prior art. This assures the fastest possible position determination while assuring the maximum required accuracy.

Automatic Detection of Static Occupation Parts

The prior-art work flow for a point measurement is: the user positions the range pole over the point to be measured, levels the range pole, holding it stable while pressing a controller key to indicate the intention to measure a point and waits for the controller to report successful measurement while still holding the rod perfectly motionless.

Two problems arise from this prior-art work flow: first, it is not that easy for an unskilled user to hold the rod while pressing a key on the controller; second, for various reasons the range pole might be held static during the whole measurement period. Especially for mapping and GIS data, many data sets show a mismatch between static occupations and the information entered by the user pressing the key.

A prior-art method of operating an RTK system automatically detects which data is collected while the rover antenna is static; the method uses delta-phase kinematic positioning to detect "pole wobble," but with a fairly relaxed threshold. If the test fails, the user is prompted to repeat the measurement. In Mapping and GIS applications—due to the higher error rate caused by more inexperienced users—Trimble's "H*" post processing looks for the longest static period within a part of the data reported as static by the user. However, the data is just rejected from static point measurement instead of fixing the data for the user. See "Fast Decimeter-Level GNSS Positioning," Patent Application Publication US 2008/0165053 dated Jul. 10, 2008 and U.S. patent application Ser. No. 12/321,843 filed Jan. 26, 2009.

In accordance with some embodiments of the invention, productivity is improved in that the user is not required to re-measure the point as long as a period of rover data sufficient for the required position accuracy is collected while the rover antenna is static. In accordance with some embodiments of the invention, the user does not have to take care of this at all so that the whole point measuring process is accelerated: the user just has to make sure to hold the range pole leveled and static for awhile, and the rover's processor will determine whether enough static data has been collected to meet the accuracy requirement.

Figure 11:
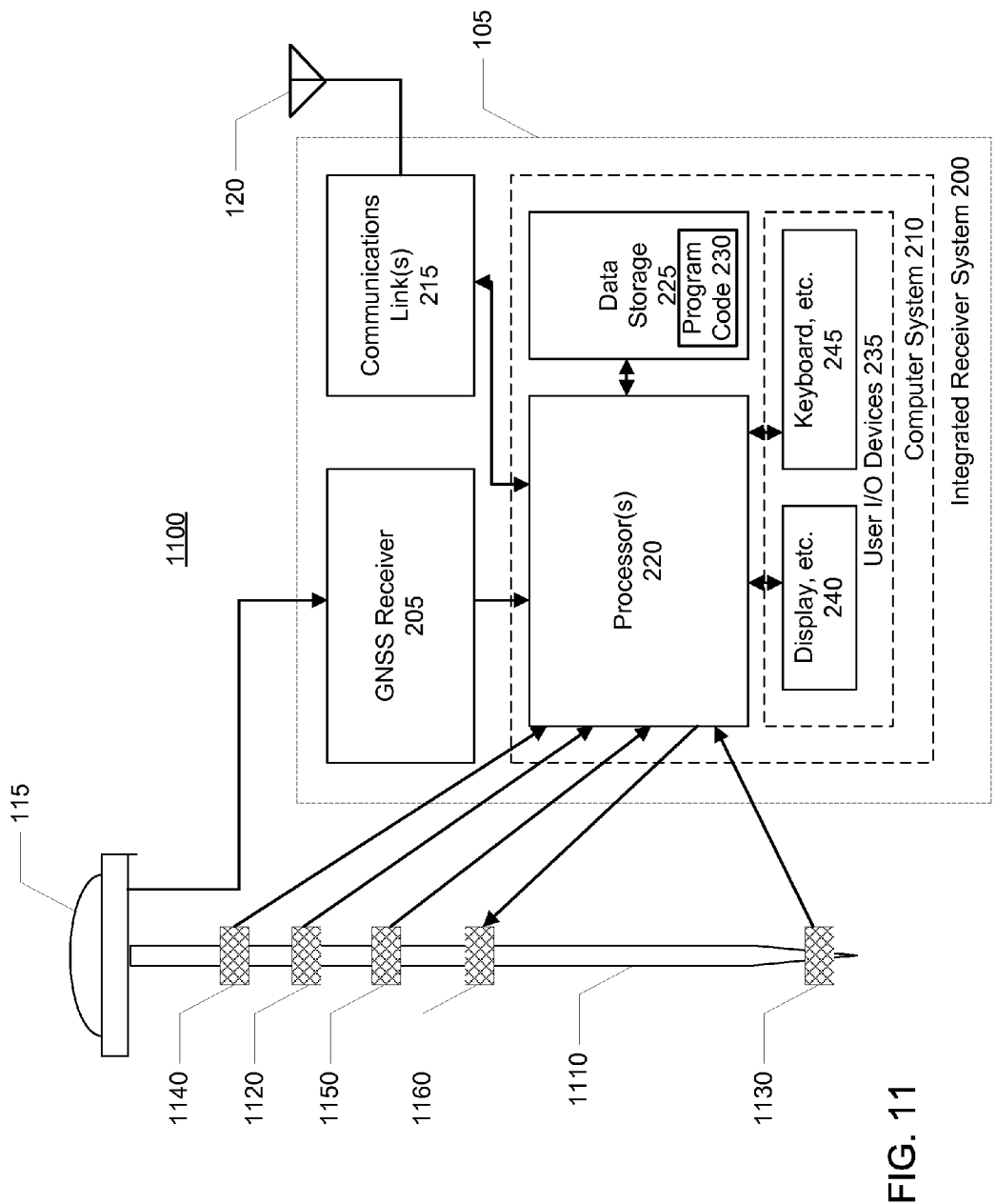
FIG. 11 is a block diagram of an integrated GNSS receiver system having improvements in accordance with some embodiments of the invention.

FIG. 11 is a block diagram of an integrated GNSS receiver system 1100 having improvements in accordance with some embodiments of the invention. Aspects of the system 1100 are discussed below with reference to workflow improvements which save user time during a static point survey. System 1100 is comparable to that of FIG. 2, except that the program code is modified to cause the processor(s) to carry out the functions described herein. In addition, range pole 1110 is modified by the addition of elements in communication with the processor(s) to perform additional functions described herein.

In some embodiments of the invention, range pole 1110 is equipped with an optional sensor or switch 1120 in communication with and providing an indication to one or more of processor(s) 220 upon user activation, e.g., by pressing a button or key or touching a capacitive sensor or equivalent. In some embodiments of the invention, range pole 1110 is equipped at or near its lower end with an optional sensor or switch 1130 in communication with and providing an indication to one or more of processor(s) 220 when the tip of the range pole is placed on a survey point, e.g., is placed at a point on the ground. In some embodiments of the invention, range pole 1110 is equipped with a motion sensor or inertial sensor 1150 in communication with and providing an indication to one or more of processor(s) 220 when the upper end of the range pole is moved and/or the range pole is tilted. In some embodiments of the invention, range pole 1110 is equipped with one or more tilt sensors 1150 in communication with and providing an indication to one or more of processor(s) 220 when the range pole is tilted from vertical and/or when the range pole is held vertical and/or near vertical. An example of a range pole equipped with a tilt sensor and GPS antenna and receiver is described in U.S. Pat. No. 5,512,905. In some embodiments of the invention, range pole 1110 is equipped with audible and/or visible and/or vibration indicators 1160 in communication with and receiving indications from one or more of processor(s) 220 to provide information in a manner detectible by the user, e.g., through visual and/or audible and/or vibratory signals.

Button-Press Registering After the Measurement

In accordance with some embodiments of the invention, e.g., using the techniques mentioned in the previous paragraphs, a point measurement button such as switch or sensor 1120 is pressed by the user after the point occupation is done. The range pole does not have to be held static when the user operates the controller (e.g., when the user presses the point-measurement button or key or provides equivalent user input indicated the intended end of the point occupation). In some embodiments of the invention, any accidental point registration is avoided by the user just not pressing the associated key at the controller.

Automatic Measurement without User Button Press with the Possibility of Canceling In accordance with some embodiments of the invention, static point measurements are automatically registered when the rover antenna is held static. If the rover is mounted on a range pole, for example, additional tilt sensor(s) 1150 are provided in accordance with some embodiments of the invention to make this detection more reliable. After collecting enough static data for the required accuracy, the data for the point is stored and some kind of feedback is issued to the user, e.g., via display 240 and/or indicator(s) 1160. If the user did not intend to measure a point, he can press a cancel button, e.g., activating switch or sensor 1120. That way, user interaction is only required for the more rare cases of accidental measurement of a point instead of the frequent default action that the whole session is about: measuring points.

Using a Switch at the Tip of the Range Pole

In accordance with some embodiments of the invention, detecting the user's intention to measure a point is improved by placing a sensor or switch 1130 on or near the tip of the range pole, for example a micro switch or a strain gage. This issues a signal to the rover whenever the range pole touches the ground, for example. Such a sensor tip, together with automatic detection of which data was collected while the rover antenna was static, greatly reduces the possibility of accidental point measurement. Some embodiments of the invention add tilt sensors 1150 and/or INS (inertial navigation system) 1140 support to further reduce the possibility of accidental point measurement.

Using a Tilt Sensor to Detect the Intention to Measure a Point

Some embodiments in accordance with the invention provide one or more tilt sensors 1150 to indicate the user's intention to measure a point, such as when the range pole is within a given limit of tilt angle. Some embodiments use only that data for point measurements which is collected by the rover when the range pole is within a given limit of tilt angle. In accordance with some embodiments, the measurement process at a point is started when the user levels the range pole (moves it to a vertical position) and holds it static to indicate a "stop" period of the survey. The user avoids accidental point measurements by slightly tilting and/or moving the range pole during the "go" periods of the survey. If that fails, the cancel process described above can be the final means to avoid spurious point registrations.

Using "Gestures" to Detect the Intention to Measure a Point

Similar to the advanced user interfaces of modern mobile devices like the iTouch and iPhone, in accordance with some embodiments of the invention a motion and/or inertial sensor 1140 is built into the range pole or the rover so that the user can communicate his intentions to the controlling software by gestures. Instead of pressing any buttons, the user indicates the action to be taken by moving the rover or the range pole in a certain pattern.

For example, a quick circular movement of the range pole before or after point measurement can indicate the intention to register a static point. A cross-like motion can be used to cancel an action, etc.

Audio and/or Visible Feedback of the Measurement Status Information

With all methods mentioned above it becomes even more important to get a clear feedback from the controller about the actions performed, e.g., via indicator(s) 1160. In some embodiments of the invention this is provided by audible signals (different kinds of "beeps" or voice output for different actions such as point registered, point cancelled, point failure) or visible signals such as information on a display screen or lights, e.g., a traffic light display (green, yellow, red) at a location easily visible to the user.

Additional Considerations

Correction Data

There are many error sources that affect a single GNSS receiver including: satellite clock, satellite ephemeris, and atmospheric.

The aforementioned error sources limit the accuracy with which a single GNSS receiver can determine absolute position with respect to the earth. The GNSS error sources are highly spatially correlated, which means that receivers operating within the same region as each other will see nearly identical satellite and atmospheric errors. This has given rise to the differential GNSS positioning techniques whereby one or more base stations track GNSS satellites in view and produce corrections that are distributed to rover GNSS receivers tracking common satellites.

Correction data as referenced herein may comprise: single base corrections, Virtual Reference Station (network) corrections, or precise orbit and clock corrections.

A single base is the simplest approach in which a GNSS reference station is placed at a known location and used to track pseudorange and phase data to all satellites in view. The pseudorange and phase observation data is then transmitted at regular epochs (say at 1 Hz) to one or more rover receivers in the vicinity of the base. The further the rover receivers are away from the base, the greater the decorrelation in the satellite and atmospheric errors and hence the worse the accuracy of the derived rover position estimates. It is generally accepted that for cm-level work, the base-rover separation should be limited to 50 km. An example of a single-base RTK system can be found in U.S. Pat. No. 5,519,620—Centimeter accurate Global Positioning System receiver for on-the-fly real-time kinematic measurement and control, Talbot, et. al.

The Virtual Reference Station technique has been developed to overcome some of the limitations of single-base RTK. A network of GNSS base stations is established over a county, province, state or nation, with say 70 km inter-base spacings. GNSS pseudorange and carrier phase data from all satellites tracked at the base stations is communicated to a centralized processing center in real-time. Satellite and atmospheric correction models are then generated by the VRS server and are interpolated for each rover operating within the network. Each rover is provided with synthetic pseudorange and carrier phase data at regular epochs (say at 1 Hz-10 Hz) for a virtual reference station operating in close proximity to the rover. At least twenty-two Trimble VRS networks have been established in countries around the world. A current listing is available on Trimble's website at http://www.trimble.com/infrastructure/vrs-installations.aspx.

GNSS satellite clock and orbital errors can be estimated using global tracking networks such as that maintained as part of the International GNSS Service (IGS). The Jet Propulsion Laboratory (JPL) use a global ground network of GNSS base stations to track each satellite and subsequently produce very precise GNSS satellite orbital and clock information. Predicted satellite clock and orbital information is then distributed in real-time to GNSS rovers so that they can correct their satellite observations and therefore produce decimeter-level position estimates within a global context. The impact of ionospheric errors are essentially removed at the rover GNSS receiver by making use of iono-free dual-frequency pseudorange and carrier phase observations. Residual tropospheric errors are estimated by the rover equipment.

Prepare Data

In accordance with some embodiments, the prepare data component 805 shown in FIG. 8 involves the following steps: (1) Storage (buffering) of rover epoch GNSS observation data, (2) Time-synchronization of reference and rover epoch GNSS observation data once the reference data is received, (3) Application of antenna correction models to base and rover observations, (4) Formation of single- (between base/rover) difference pseudorange and carrier phase observations for each GNSS frequency band, (5) Application of tropospheric correction models to single-difference observations, (6) Application of ionospheric correction models to single-difference observations, (7) Form linear combination(s) of carrier phase and pseudorange observations for each satellite—e.g. form single-difference iono-free carrier phase combination, single-difference narrow-lane pseudo-range combination, etc. The linear combinations possess certain important characteristics that are exploited during the position calculations. For example iono-free combinations are essentially free of ionospheric bias.

Single-differencing of GNSS observations helps to reduce the impact of satellite dependent error sources. Satellite clock errors are essentially removed by single-difference formation between base and rover receiver data which was collected at the same time instant (epoch).

Primary Precise Positioning

Delta phase techniques provide a method for determining the change in position that has occurred over a time interval of seconds up to tens of minutes. Delta phase position changes are therefore combined with an underlying (primary precise) positioning technique in order to obtain the absolute earth-centered, earth-fixed coordinates of the rover. The accuracy of the delta phase position estimates is therefore reliant on the quality of the primary precise positioning technique. Hence the primary precise positioning technique generally involves rigorous modeling of measurement error sources plus the resolution of the GNSS carrier phase ambiguities. Many examples are known the art, including those described in U.S. Pat. No. 7,432,853, U.S. Pat. No. 7,312,747, Patent Application Publication US 2008/0165055, Patent Application Publication US 2008/0165054, International Patent Publication WO 2007/032947, Patent Application Publication US 2009/0027264, Patent Application Publication US 2008/0165053, U.S. patent application Ser. No. 12/321,843, filed Jan. 26, 2009, U.S. patent application Ser. No. 12/291,888, filed Nov. 14, 2008, International Patent Publication WO 2009/000314, U.S. patent application Ser. No. 12/319,623, filed Jan. 8, 2009, International Patent Application No. PCT/US2008/012045, with international filing date 23 Oct. 2008, and U.S. Provisional Application for Patent 61/189,382, 19 Aug. 2008.

Delta Phase

A detailed description of delta phase processing can be found in Traugott, J, et. al, 2008, *Making a Difference with GPS*, GPS World, May 1.

GNSS carrier phase observations provide precise (mm-level) measurements of the user-satellite range (distance). A significant complication with carrier phase observations is that they contain an inherent ambiguity term which arises from not knowing exactly how many whole carrier cycles there were between user and satellite at the start of carrier tracking. Consider the following simplified GNSS carrier phase observation equation:

$$\phi_r^s(t) = R_r^s(t)/\lambda + n_r^s \quad (1)$$

Where:

$\phi_r^s(t)$ carrier phase observation for receiver r, satellite s, at epoch t;

$R_r^s(t)$ geometric range from receiver r, to satellite s, at epoch t, which is related to the satellite position [$x^s(t)$, $y^s(t)$, $z^s(t)$] and receiver position [$x_r(t)$, $y_r(t)$, $z_r(t)$], via:

$$R_r^s(t) = \sqrt{[x^s(t) - x_r(t)]^2 + [y^s(t) - y_r(t)]^2 + [z^s(t) - z_r(t)]^2} \quad (2)$$

$\lambda$ wavelength of the carrier, $n_r^s$ integer carrier phase ambiguity term for satellite s and receiver r.

The satellite coordinates contained in the range term $R_r^s(t)$ are given by the satellite ephemeris and the carrier wavelength is a constant, hence the only unknown quantity in (1) is the carrier phase ambiguity term. Once the carrier phase ambiguity is known, the user position can be directly estimated with carrier phase observations from multiple satellites.

Delta phase is obtained by time-differencing carrier phase observations as explained by the simplified model below:

$$\delta\phi_r^s(t_i) = \phi_r^s(t_i) - \phi_r^s(t_0) = [R_r^s(t_i) - R_r^s(t_0)]/\lambda \quad (3)$$

The delta phase observations are constructed in (3) over the time interval $t_i - t_0$, where $t_0$ is the reference epoch. Reference epochs can be conveniently taken as even (1 Hz) times. When carrier-phase tracking is continuous, the carrier phase ambiguity term is constant, hence it is omitted from (3). Again assuming that the satellite position is known (based on the satellite ephemeris), then the only unknown quantity in (3) is the change in user position over $t_1 - t_0$, contained in the range terms. In practice, the receiver clock drift must also be estimated during delta phase processing, hence the delta phase observations are a function of the change in user location and receiver clock drift:

$$\delta\phi(t_i) = f(\delta x, \delta y, \delta z, \delta t) \quad (4)$$

Where:

$\delta x, \delta y, \delta z$ the change in user position (given in terms of Cartesian coordinates) over the delta phase time interval, $\delta t$ the drift in the receiver clock over the delta phase time interval, A minimum of four independent satellite delta phase observations is required to estimate the unknown quantities. The following linearized matrix measurement model can be used in the estimation process:

$$l + v = Ax \quad (5)$$

$$\begin{bmatrix} \delta\phi^1(t_1) \\ \delta\phi^2(t_1) \\ \cdots \\ \delta\phi^s(t_1) \end{bmatrix} + \begin{bmatrix} v^1 \\ v^2 \\ \cdots \\ v^s \end{bmatrix} = \begin{bmatrix} \frac{\partial f^1}{dx} & \frac{\partial f^1}{dy} & \frac{\partial f^1}{dz} & 1 \\ \frac{\partial f^2}{dx} & \frac{\partial f^2}{dy} & \frac{\partial f^2}{dz} & 1 \\ \cdots & \cdots & \cdots & \cdots \\ \frac{\partial f^s}{dx} & \frac{\partial f^s}{dy} & \frac{\partial f^s}{dz} & 1 \end{bmatrix} \begin{bmatrix} \Delta\delta x(t_1) \\ \Delta\delta y(t_1) \\ \Delta\delta z(t_1) \\ \Delta\delta t(t_1) \end{bmatrix}$$

Where:

l (s×1) vector of delta phase observations v (s×1) vector of residuals,

A (s×4) design matrix, x (4×1) state vector $\partial f^1/dx$ partial derivative of the delta phase observation for satellite 1, with respect to the change in user coordinate x, (with like definitions for y & z coordinates)

$\Delta\delta x(t_1)$ correction to x coordinate change for epoch $t_1$, (with like definitions for y & z coordinates), $\Delta\delta t(t_1)$ correction to the receiver clock drift term for epoch $t_1$.

The unknown quantities can be estimated via well known least squares or Kalman filtering techniques.

Combination of Delta Phase Positions

Figure 12:
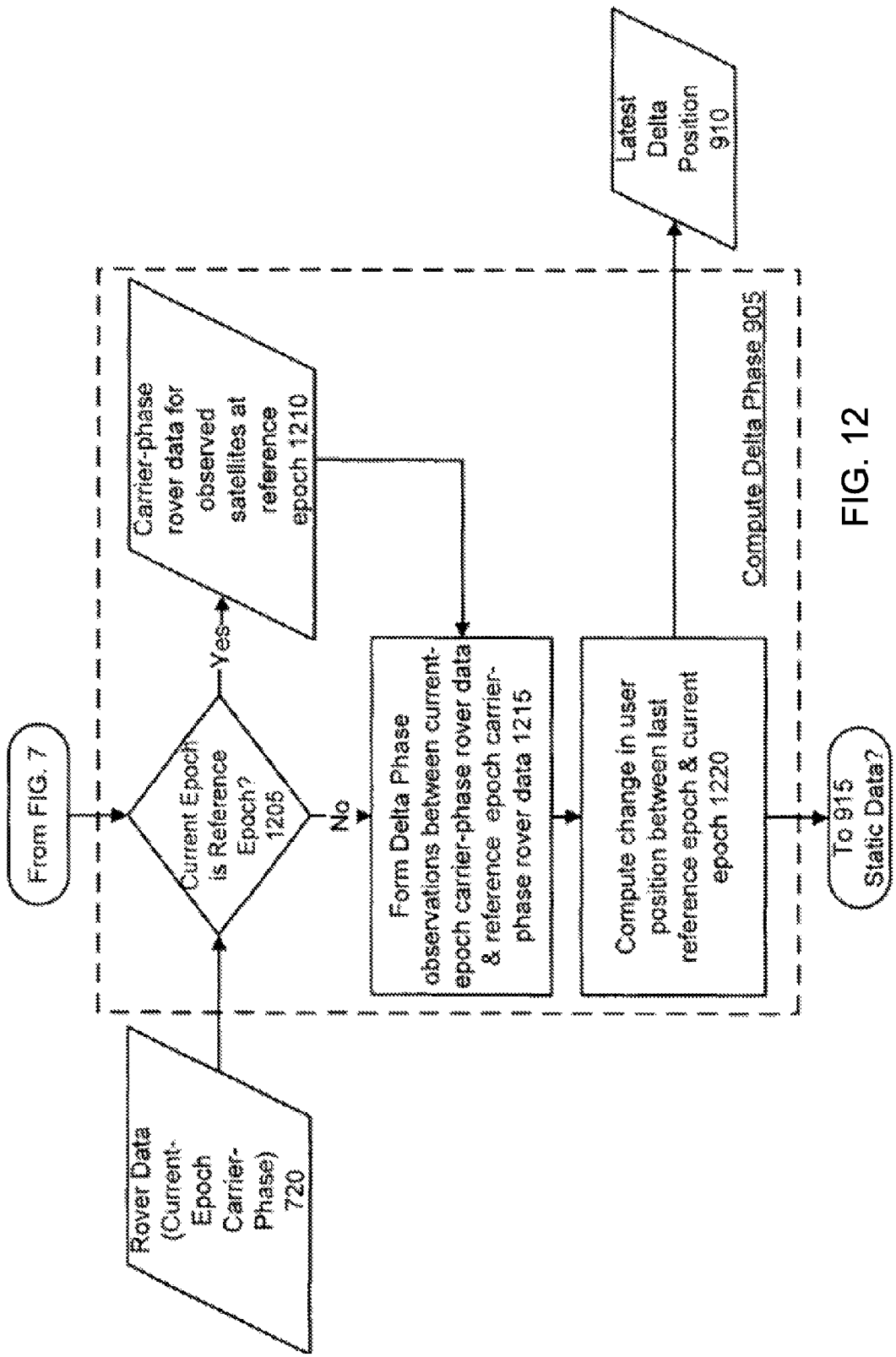
FIG. 12 is a flow chart illustrating how delta-phase positions 915 are computed in accordance with some embodiments of the invention.

FIG. 12 is a flow chart illustrating how delta-phase positions 915 are computed at 905 in accordance with some embodiments of the invention. At 1205 a check is made whether is current epoch is a reference (synchronized-position) epoch. If yes, then the carrier-phase observations of rover data 720 for observed satellites at the current epoch are buffered for use at 1215. If no, then at 1215 a difference is formed between the current-epoch carrier-phase rover observations and the reference-epoch carrier-phase rover observations. At 1220 the difference formed at 1215 is used to compute the change in rover Position between the last reference epoch and the current epoch, and this is provided at the latest delta position.

Any plurality of the above described aspects of the invention may be combined to form further aspects and embodiments, with the aim of providing additional benefits notably in terms of surveying efficiency and/or system usability.

Above-described apparatuses and their embodiments may be integrated into a rover, a reference receiver or a network station, and/or the processing methods described can be carried out in a processor which is separate from and even remote from the receiver/s used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a reference receiver or a network station including any one of the above apparatuses.

In some embodiments, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different person or entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of determining a static position of an antenna of a rover from observations of GNSS signals collected at the antenna over multiple epochs and from correction data for at least one of the epochs, comprising:
   acquiring, using the antenna of the rover, a first observation of GNSS signals received at the antenna during a first epoch, wherein the rover is at a first position;
   obtaining first correction data, wherein the first correction data correlates to the first epoch;
   determining a first calculation of the position of the rover for the first epoch from the first observation and the first correction data;
   acquiring, using the antenna of the rover, a second observation of GNSS signals received at the antenna during a second epoch, wherein:
   correction data is unavailable for the second epoch; and
   the rover is at a second position;
   acquiring, using the antenna of the rover, a third observation of GNSS signals received at the antenna during a third epoch, wherein the rover is at the second position;
   determining that the antenna remained static for the second epoch and the third epoch; and
   determining a second calculation of the position of the rover by combining the first calculation of the position of the rover with a calculated difference between the second position and the first position, after determining that the antenna remained static for the second epoch and the third epoch, wherein the calculated difference between the second position and the first position is determined based on the second observation and the third observation.

2. The method of claim 1, wherein the first correction data comprises at least one of: correction data prepared from observations of a base station, correction data prepared from observations of a network of reference stations, and precise orbit and clock information for satellites broadcasting the GNSS signals.

3. The method of claim 1, wherein a minimum number of static epochs is mandated by at least one of: (1) user input, (2) a minimum occupation time at a survey point, and (3) an estimated accuracy of the second calculation of the position of the rover.

4. The method of claim 1, wherein:
the method further comprises acquiring one or more additional observations of GNSS signals received at the antenna during one or more additional epochs;
the rover is at the second position for the one or more additional epochs; and
determining the second calculation of the position of the rover further includes combining the one or more additional observations with the second observation and the third observation.

5. The method of claim 4, wherein combining comprises averaging.

6. The method of claim 1, wherein determining the second calculation of the position of the rover comprises:
determining a first rover position change relative to the first calculation of the rover position based on the second observation;
determining a second rover position change relative to the first calculation of the rover position based on the third observation;
averaging the first rover position change with the second rover position change to get the calculated difference between the second position and the first position.

7. The method of claim 6, wherein combining comprises adding.

8. The method of claim 1, wherein determining that the antenna remained static for the second epoch and the third epoch comprises:
receiving user input designating a static time interval, and
determining that the second epoch and the third epoch are within the static time interval.

9. The method of claim 1, wherein determining that the antenna remained static for the second epoch and the third epoch comprises receiving input from a physical sensor comprising at least one of: a contact switch, an inertial sensor, and a motion detector.

10. The method of claim 1, wherein determining that the antenna remained static for the second epoch and the third epoch comprises:
determining a first location of the rover based on the second observation;
determining a second location of the rover based on the third observation;
comparing the first location with the second location; and
designating the second epoch and the third epoch as static epochs because a difference between the first location and the second location is less than a predetermined threshold.

11. The method of claim 1, wherein determining the second calculation of the position of the rover comprises:
forming a difference between carrier-phase rover observations of the second observation and carrier-phase rover observations of the first observation.

12. A surveying system for determining a position of a rover from observations of GNSS signals collected at an antenna over multiple epochs and from correction data for at least one of the epochs, comprising:

a rover body;
a receiver coupled with the rover body and configured to:
acquire, using the antenna, a first observation of GNSS signals received at the antenna during a first epoch, wherein the rover is at a first position;
acquire, using the antenna, a second observation of GNSS signals received at the antenna during a second epoch, wherein:
correction data is unavailable for the second epoch; and
the rover is at a second position; and
acquire, using the antenna, a third observation of GNSS signals received at the antenna during a third epoch, wherein the rover is at the second position;
the antenna coupled with the receiver;
a data link coupled with the rover body and configured to obtain first correction data provided by a correction source, wherein:
the first correction data correlates to the first epoch; and
the correction source is separated by a distance from the rover body; and
one or more processors configured to:
determine a first calculation of the position of the rover for the first epoch from the first observation and the first correction data; and
determine a second calculation of the position of the rover by combining the first calculation of the position of the rover with a calculated difference between the second position and the first position, after determining that the antenna remained static for the second epoch and the third epoch, wherein the calculated difference between the second position and the first position is determined based on the second observation and the third observation.

13. The system of claim 12, wherein the data link is operative to obtain at least one of: correction data prepared from measurements of GNSS signals received at an antenna of a base station receiver, correction data prepared from measurements of GNSS signals received at respective antennas of reference station receivers of a network of reference stations, and precise orbit and clock information defining physical orbits of satellites broadcasting the GNSS signals and defining clock parameters of clocks of the satellites.

14. The system of claim 12, wherein the one or more processors is operative to define a minimum number of static epochs by at least one of: (i) receiving input from a user, (2) measuring a minimum occupation time of the rover at a survey point, and (3) determining a minimum estimated accuracy of observations of GNSS signals.

15. The system of claim 12, wherein determining the second calculation of the position of the rover comprises:
determining a first rover position change based on the second observation;
determining a second rover position change relative to the first calculation of the rover position based on the third observation; and
combining the first rover position change with the second rover position change to get the calculated difference between the second position and the first position.

16. The system of claim 15, wherein combining comprises averaging.

17. The system of claim 15, wherein combining the first calculation of the rover position with the calculated difference between the second position and the first position comprises adding.

18. The system of claim 12, wherein the receiver is operative to determine that the antenna position remained static for at least two static epochs by:
- receiving user input designating a static time interval, and
- determining that the static epochs are within the static time interval.

19. The system of claim 12, wherein the receiver is operative to determine that the antenna remained static for at least two static epochs using input from a physical sensor comprising at least one of: a contact switch, an inertial sensor, and a motion detector.

20. The system of claim 12, wherein the receiver is operative to determine that the antenna remained static for at least two epochs by:
- determining a first location of the rover based on the second observation;
- determining a second location of the rover based on the third observation;
- comparing the first location with the second location; and
- designating the second epoch and the third epoch as static epochs because a difference between first location and the second location is less than a predetermined threshold.

21. The system of claim 12, wherein the one or more processors is configured to determine the second calculation of the position of the rover by:
- forming a difference between carrier-phase rover observations of the second observation and carrier-phase rover observations of the first observation.

22. A memory device having instructions, for determining a position a rover from observations of GNSS signals collected at the antenna over multiple epochs and from correction data for at least one of the epochs, that when executed cause one or more processors to:
- acquire a first calculation of the position of the rover for a first epoch from:
  - a first observation of GNSS signals received at the antenna during the first epoch, wherein the rover is at the first position; and
  - first correction data, wherein the first correction data correlates to the first epoch;
- acquire a second observation of GNSS signals received at the antenna during a second epoch, wherein:
  - correction data is unavailable for the second epoch; and
  - the rover is at a second position;
- acquire a third observation of GNSS signals received at the antenna during a third epoch, wherein the rover is at the second position;
- determine that the antenna remained static for the second epoch and the third epoch; and
- determine a second calculation of the position of the rover by combining the first calculation of the position of the rover with a calculated difference between the second position and the first position, after determining that the antenna remained static for the second epoch and the third epoch, wherein the calculated difference between the second position and the first position is determined based on the second observation and the third observation.

* * * * *